(12) United States Patent
Suzuki et al.

(10) Patent No.: US 12,704,608 B2
(45) Date of Patent: Aug. 11, 2026

(54) LIGHT RECEIVING DEVICE, METHOD OF CONTROLLING LIGHT RECEIVING DEVICE, AND ELECTRONIC APPARATUS

(71) Applicant: SONY SEMICONDUCTOR SOLUTIONS CORPORATION, Kanagawa (JP)

(72) Inventors: Nobuharu Suzuki, Kanagawa (JP); Toshihiro Oba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1081 days.

(21) Appl. No.: 17/786,017

(22) PCT Filed: Nov. 19, 2020

(86) PCT No.: PCT/JP2020/043137
§ 371 (c)(1),
(2) Date: Jun. 16, 2022

(87) PCT Pub. No.: WO2021/131431
PCT Pub. Date: Jul. 1, 2021

(65) Prior Publication Data

US 2023/0014474 A1 Jan. 19, 2023

(30) Foreign Application Priority Data

Dec. 25, 2019 (JP) ................................ 2019-234076

(51) Int. Cl.
*G01S 7/48* (2006.01)
*G01S 7/4863* (2020.01)
(Continued)

(52) U.S. Cl.
CPC .......... *G01S 7/4863* (2013.01); *G01S 17/894* (2020.01); *H04N 23/56* (2023.01); *H04N 23/667* (2023.01)

(58) Field of Classification Search
USPC ........................................................ 356/5.01
See application file for complete search history.

(56) References Cited

U.S. PATENT DOCUMENTS 10,031,214 B2 * 7/2018 Rosenzweig ......... G01S 7/4972
10,317,534 B2 * 6/2019 Eshel .................... G01S 7/4863
(Continued)

FOREIGN PATENT DOCUMENTS

CN 110268283 A 9/2019
JP 2008-145386 A 6/2008
(Continued)

OTHER PUBLICATIONS

English Translation of the Written Opinion of the International Search Authority for PCT/JP2020/043137 (Year: 2020).*
(Continued)

*Primary Examiner* — James R Hulka
(74) *Attorney, Agent, or Firm* — CHIP LAW GROUP

(57) ABSTRACT

A light receiving device of the present disclosure includes an imaging section in which a pixel including a light receiving element is disposed, a read processing section that reads a pixel signal from the imaging section, a signal processing section that executes predetermined signal processing on the pixel signal read by the read processing section, and a system controller, and has a short distance mode that is freely settable. The system controller has a function of calculating, when the short distance mode is set, a distance to a distance measurement target with use of the pixel signal in a partial region within a pixel region of the imaging section, and a function of determining whether or not the
(Continued)

distance calculated satisfies a detection condition that is set in advance.

13 Claims, 17 Drawing Sheets

(51) Int. Cl.

| | |
|---|---|
| ***G01S 17/894*** | (2020.01) |
| ***H04N 23/56*** | (2023.01) |
| ***H04N 23/667*** | (2023.01) |

(56) References Cited

U.S. PATENT DOCUMENTS

| | | | | |
|---|---|---|---|---|
| 11,500,076 | B2 * | 11/2022 | Keilaf | G01S 7/4816 |
| 2018/0120424 | A1 * | 5/2018 | Eshel | G01S 17/931 |
| 2018/0136331 | A1 * | 5/2018 | Rosenzweig | G01S 7/4861 |
| 2019/0271767 | A1 | 9/2019 | Keilaf et al. | |
| 2023/0018095 | A1 * | 1/2023 | Mahara | G01S 7/48 |

FOREIGN PATENT DOCUMENTS

| | | | |
|---|---|---|---|
| JP | 2010-008092 | A | 1/2010 |
| JP | 2012-029130 | A | 2/2012 |
| JP | 2013-207415 | A | 10/2013 |
| JP | 2014-027386 | A | 2/2014 |
| JP | 2020-504291 | A | 2/2020 |
| KR | 10-2019-0049871 | A | 5/2019 |
| WO | 2018/091970 | A1 | 5/2018 |

OTHER PUBLICATIONS

International Search Report and Written Opinion of PCT Application No. PCT/JP2020/043137, issued on Jan. 12, 2021, 12 pages of ISRWO.

* cited by examiner

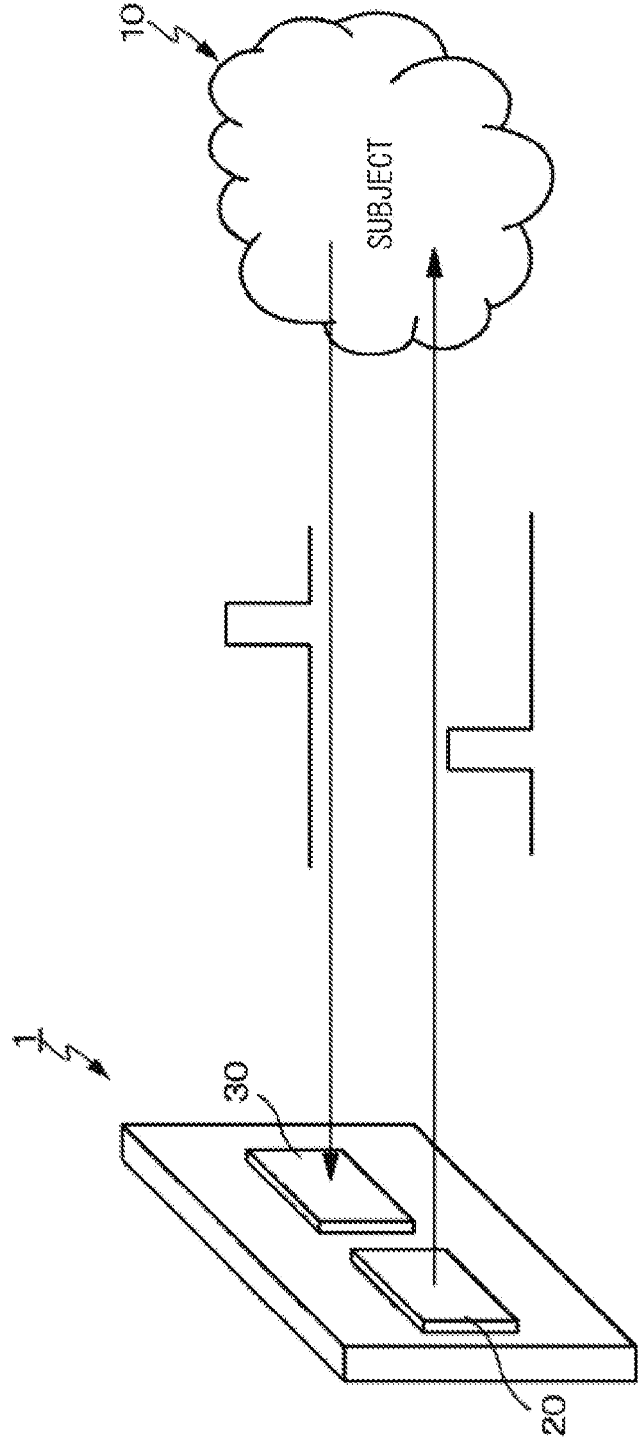
[FIG. 1]

[FIG. 2]
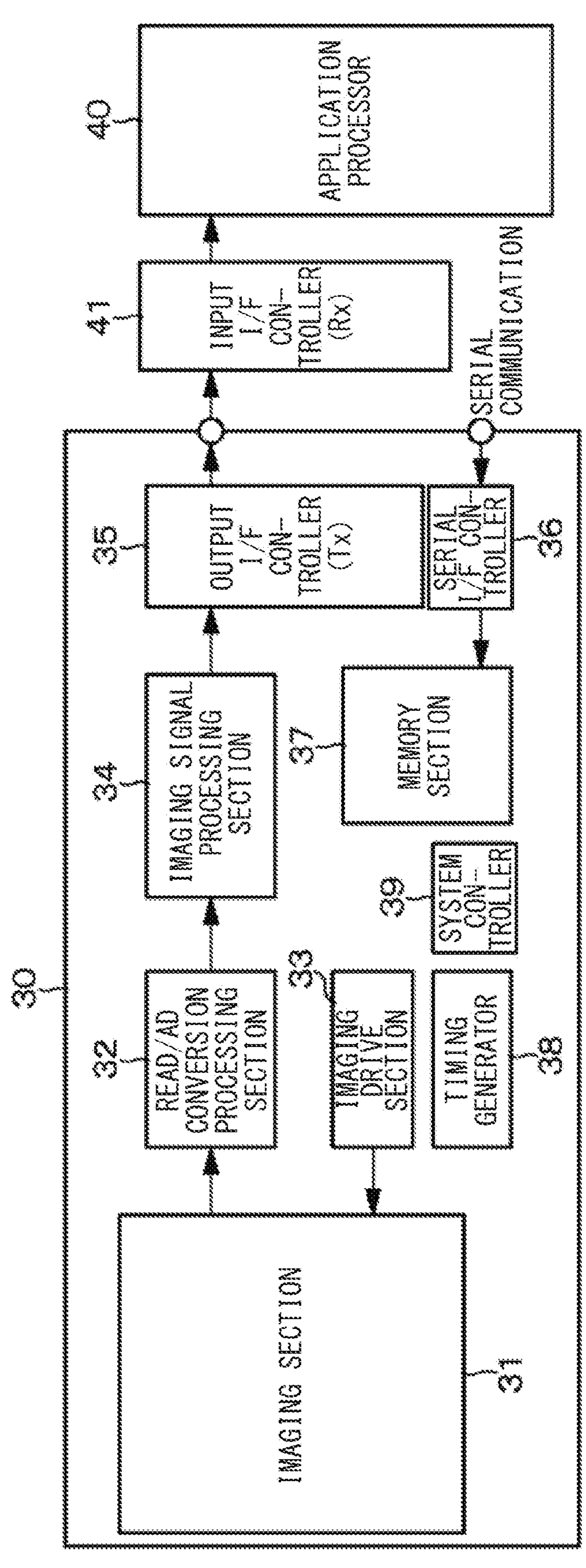

[FIG. 3]
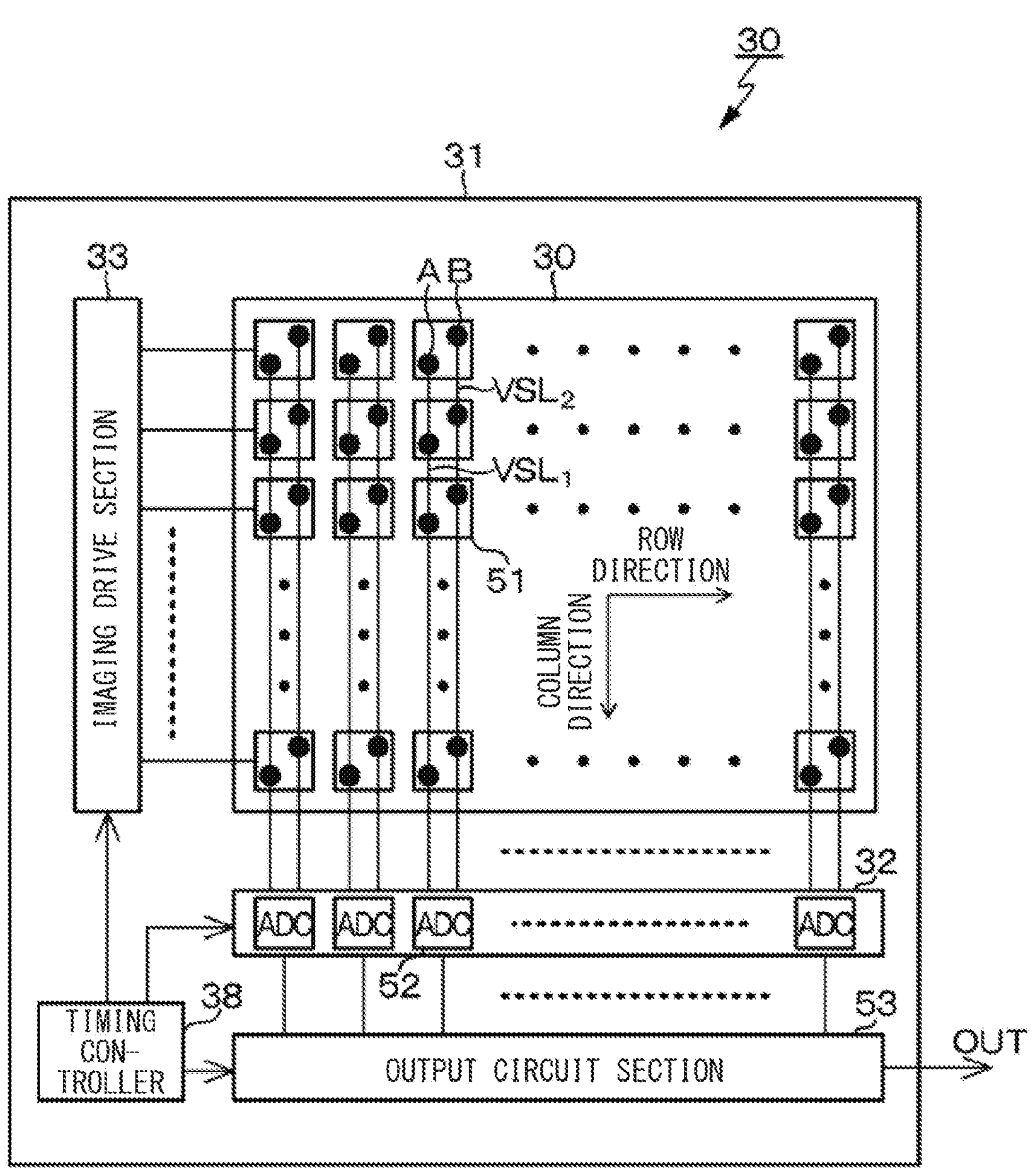

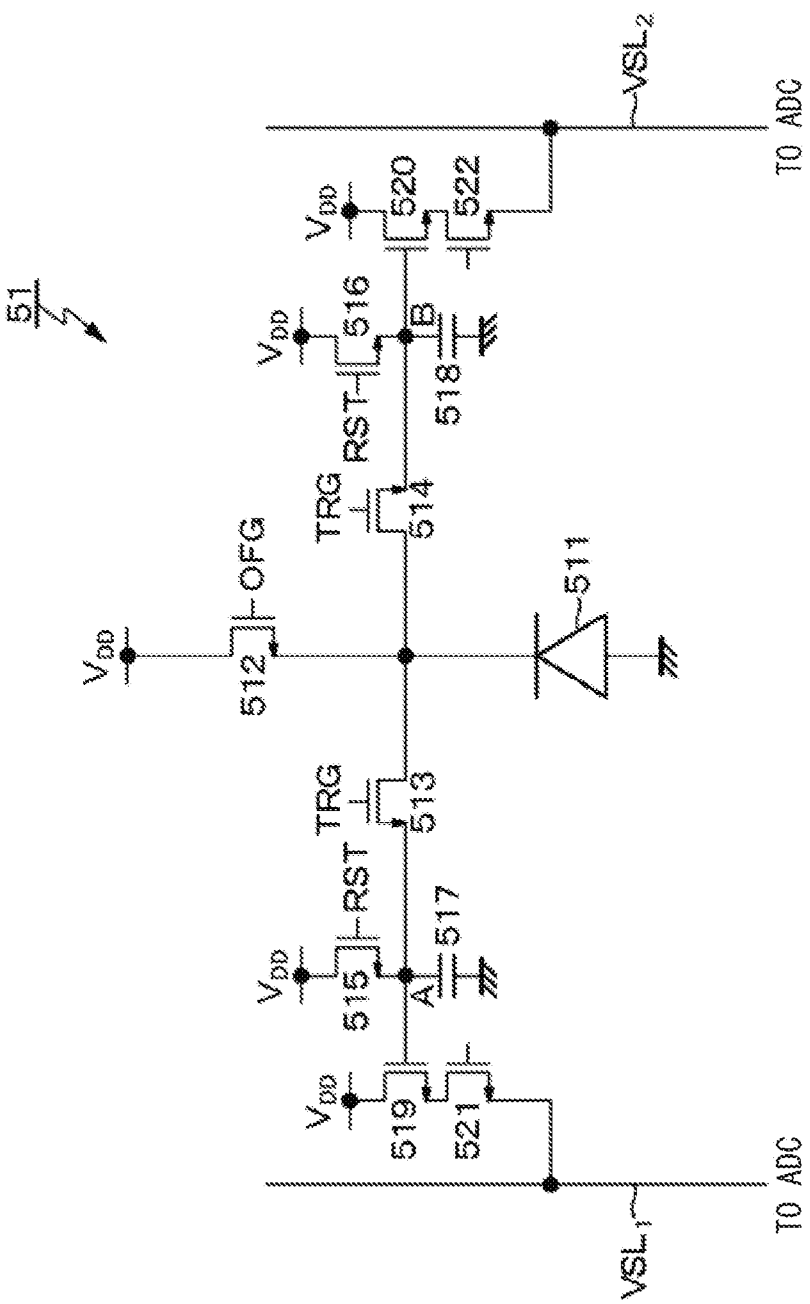
[FIG. 4]

[FIG. 5]
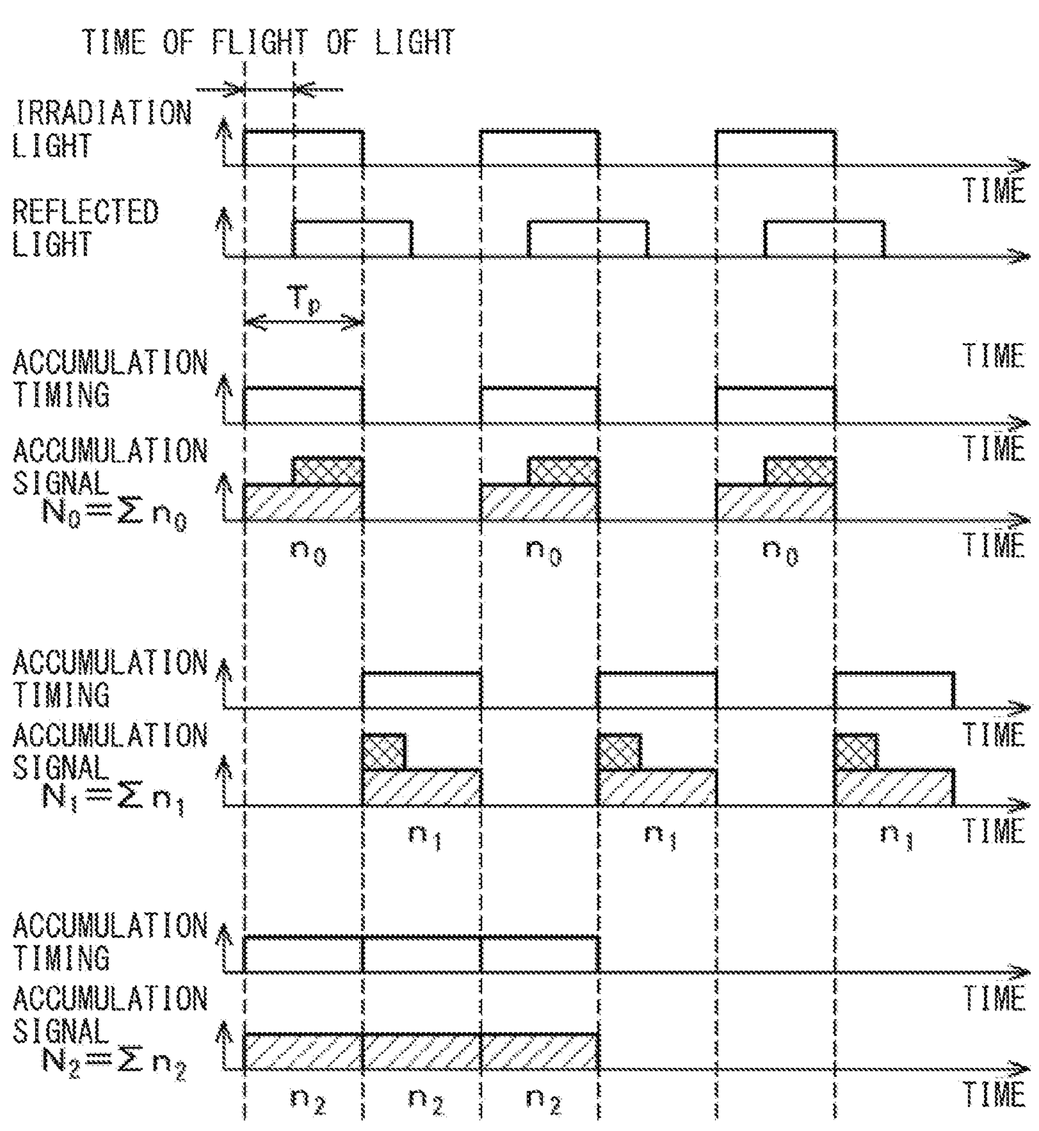

[FIG. 6]
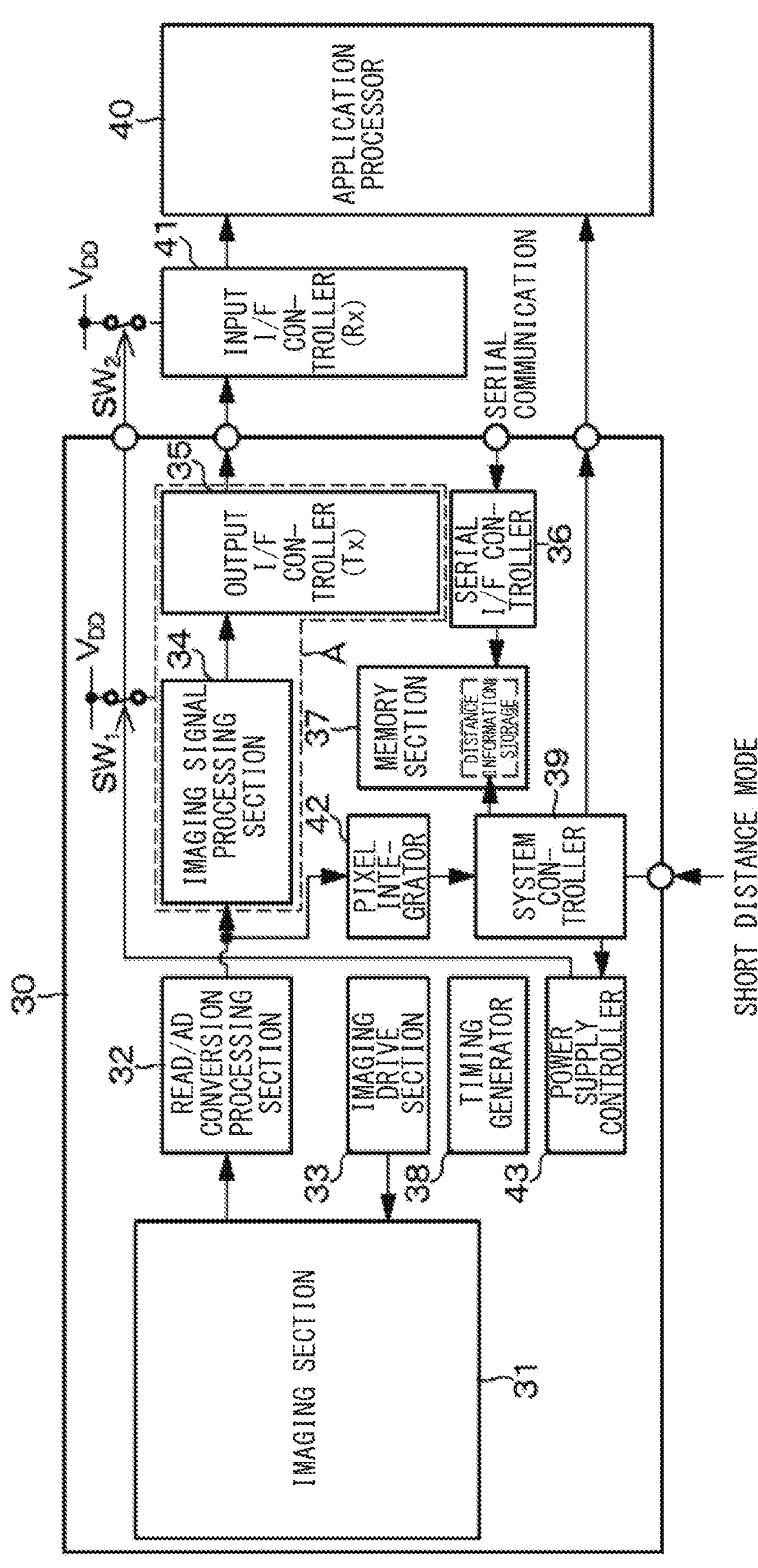

[FIG. 7]
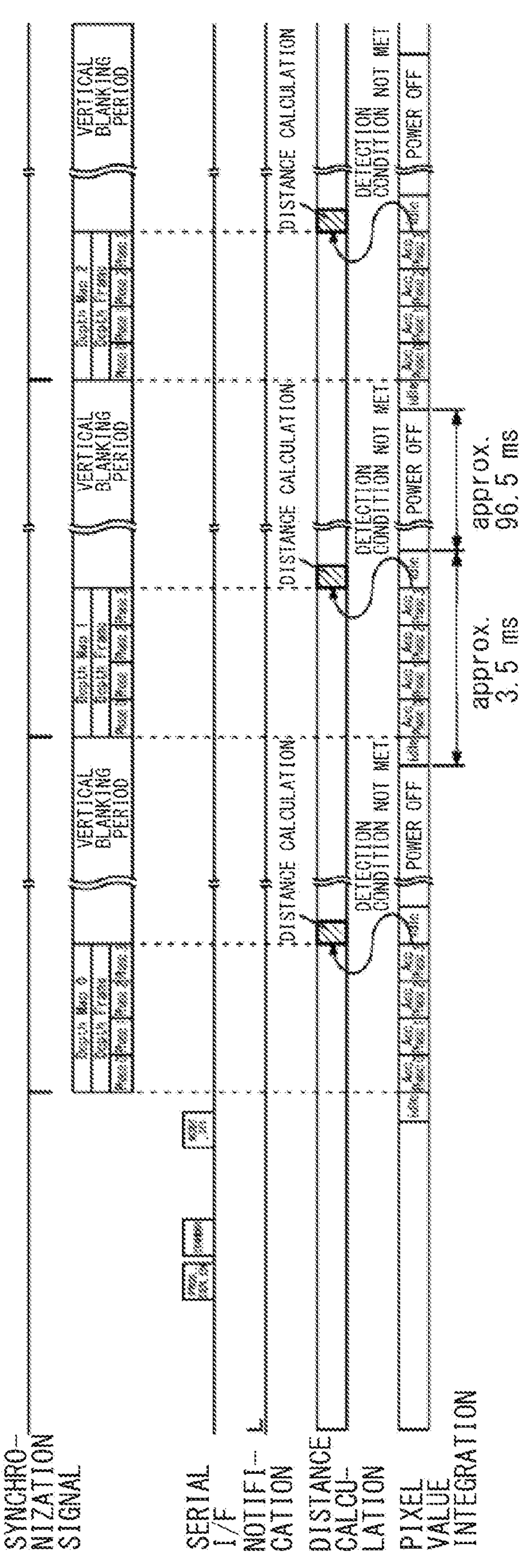

[FIG. 8]
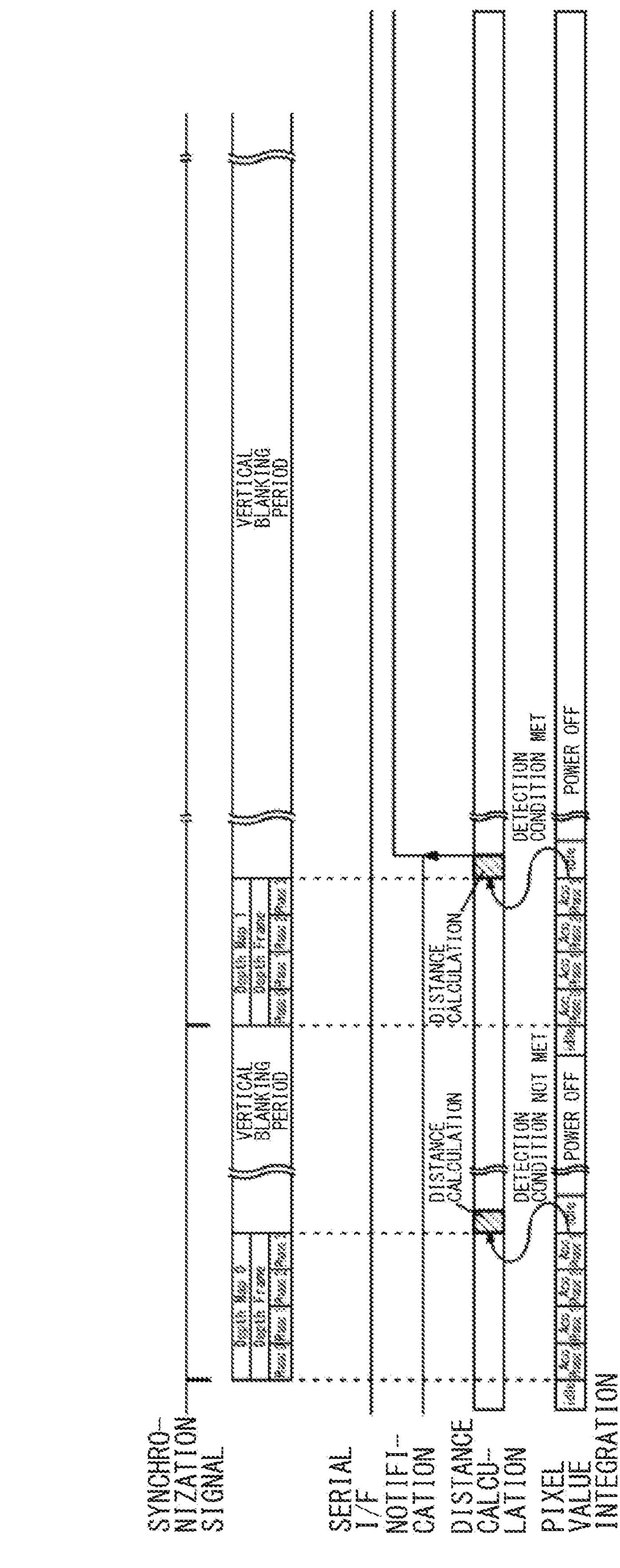

[FIG. 9]
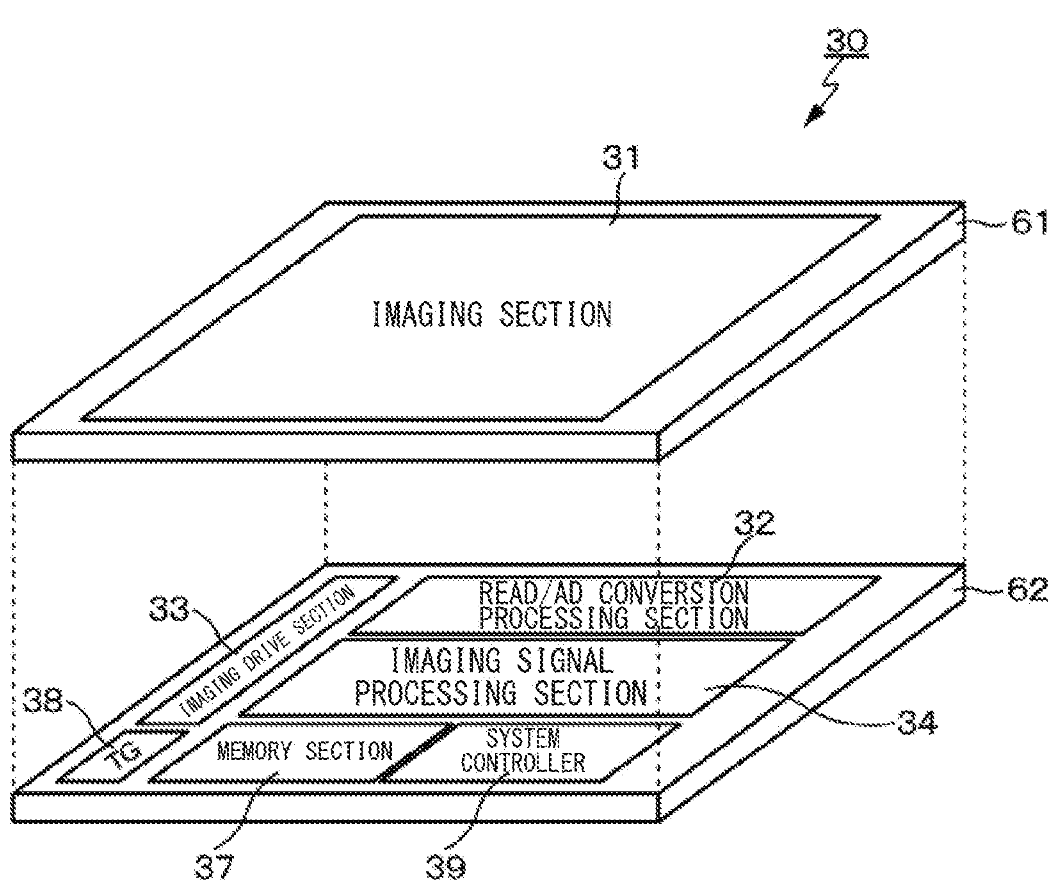

[FIG. 10A]
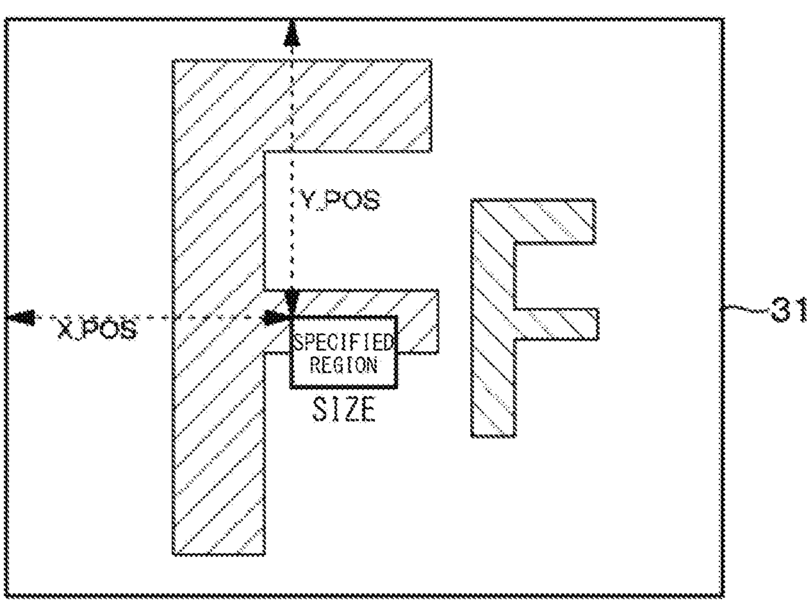
[FIG. 10B]
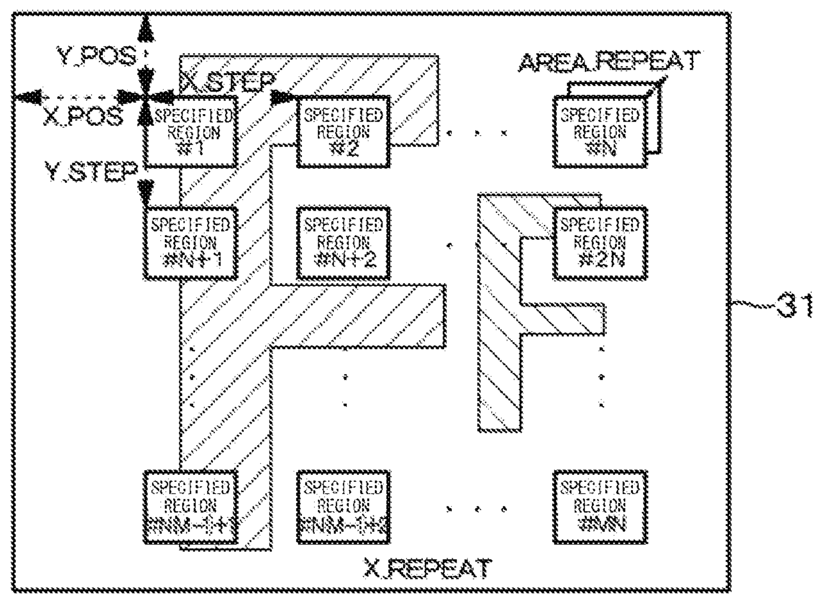

[FIG. 11]
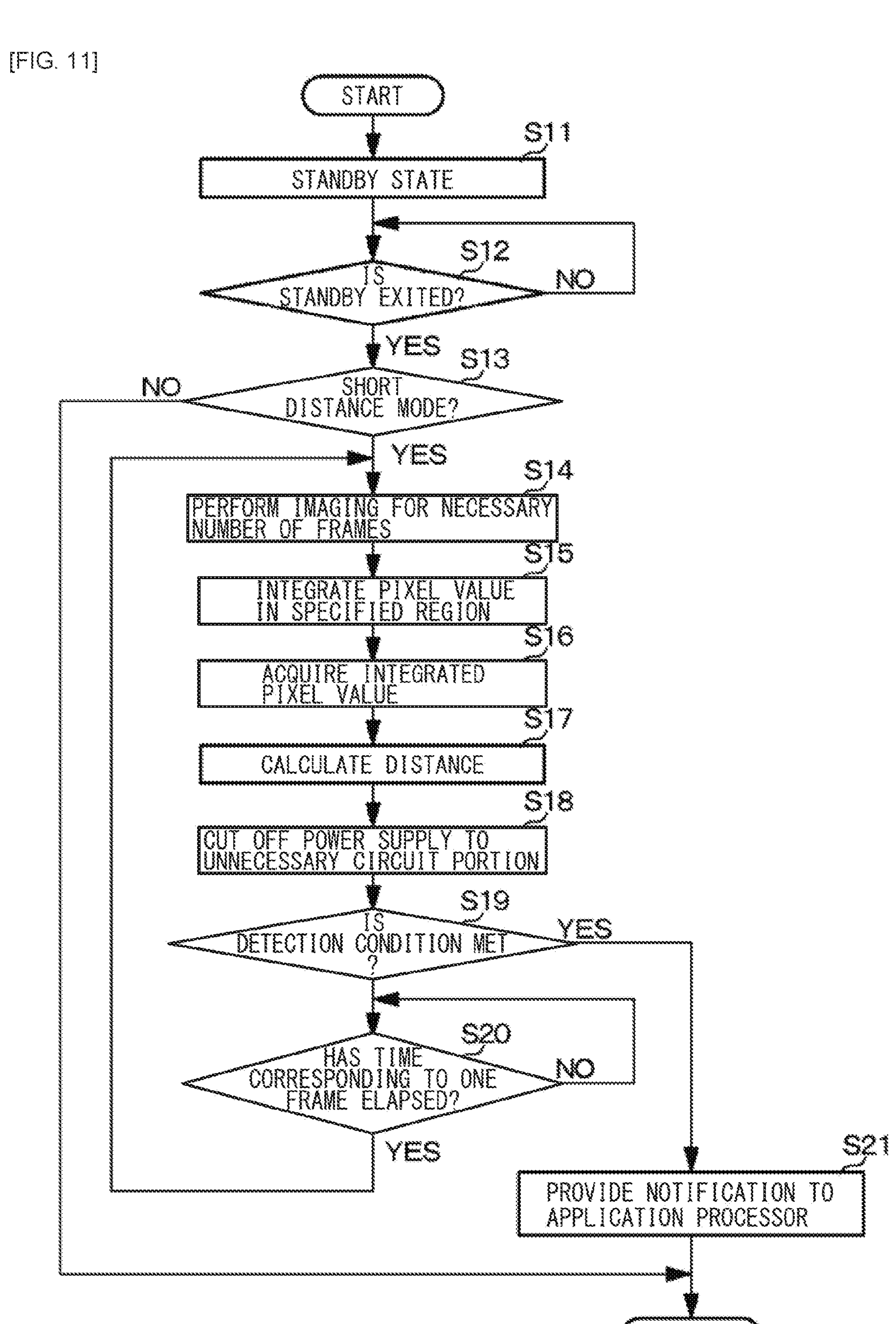

[FIG. 12A]
NEG_COND=0
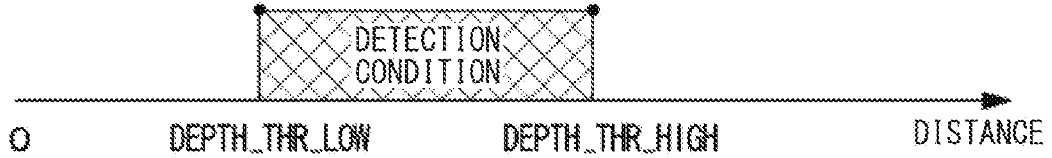
[FIG. 12B]
NEG_COND=1 (LOGICAL NEGATION OF CONDITIONAL EXPRESSION)

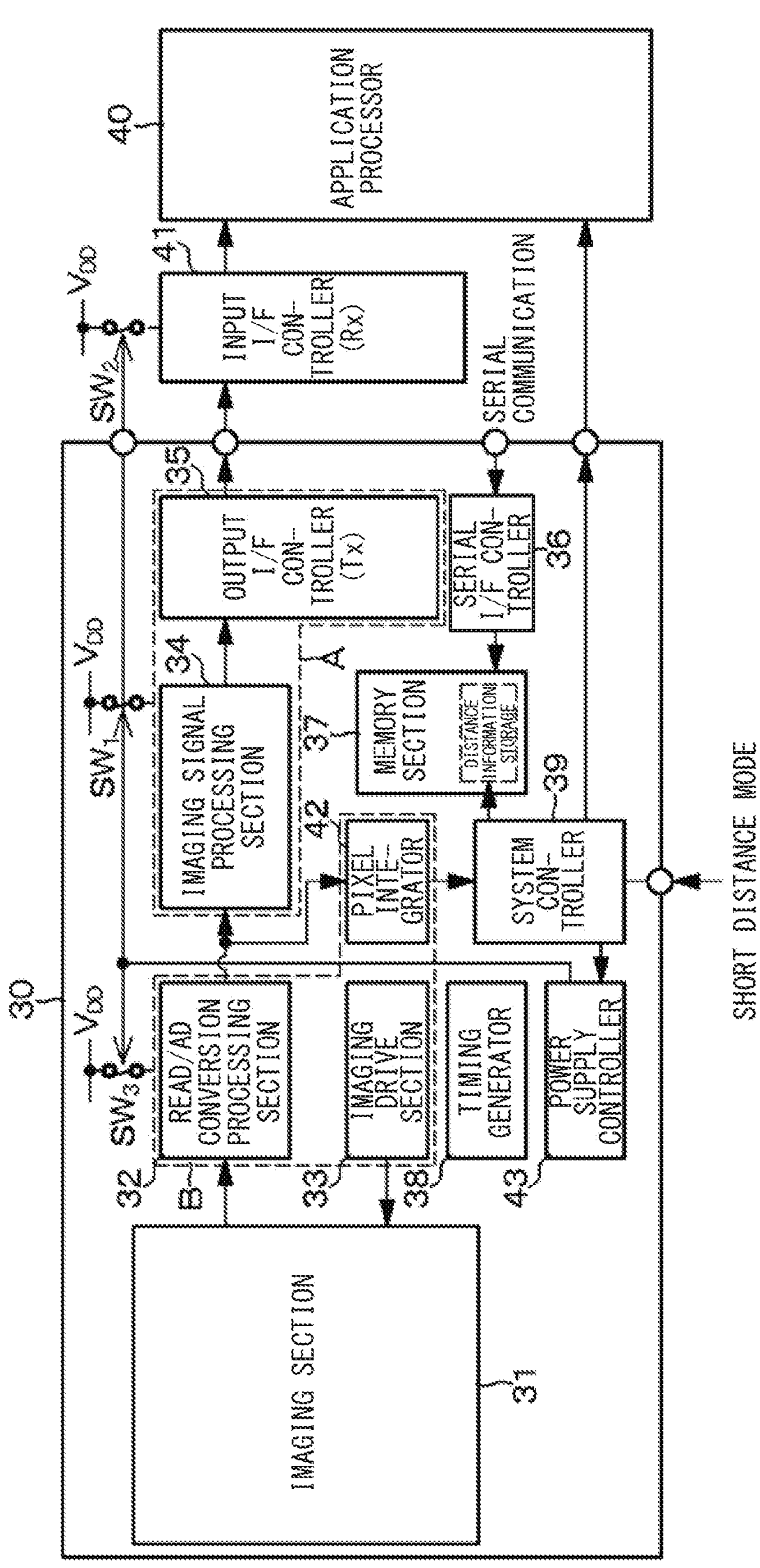
[FIG. 13]

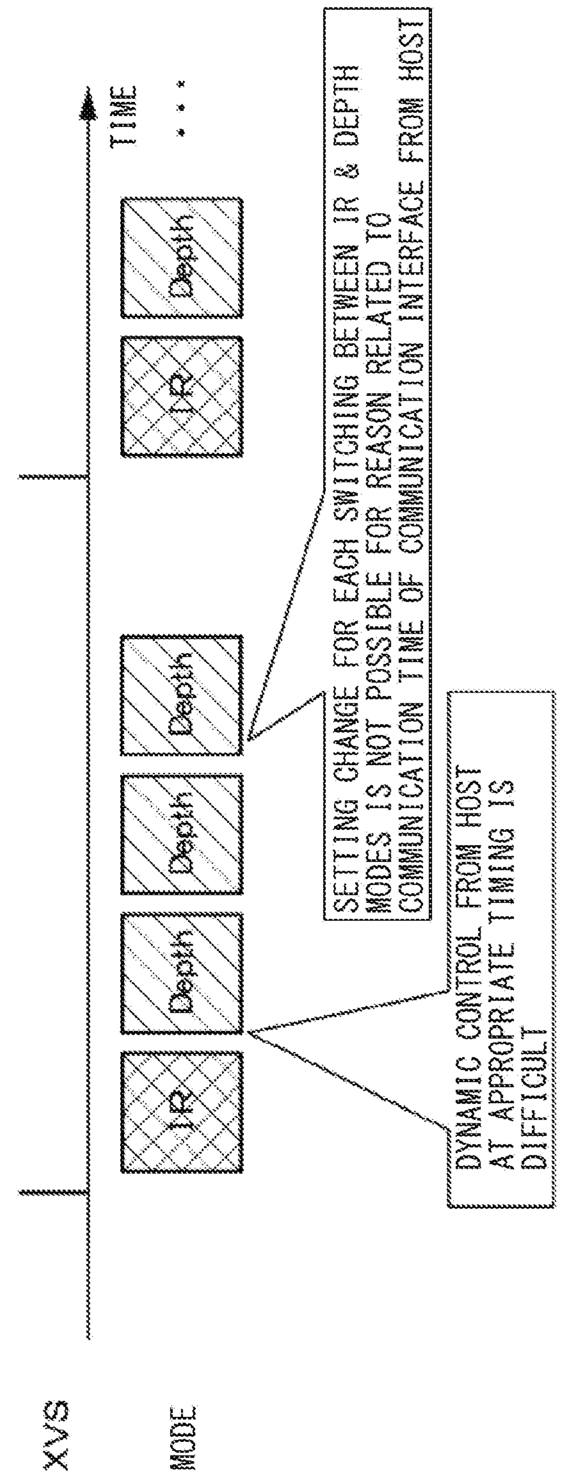
[FIG. 14]

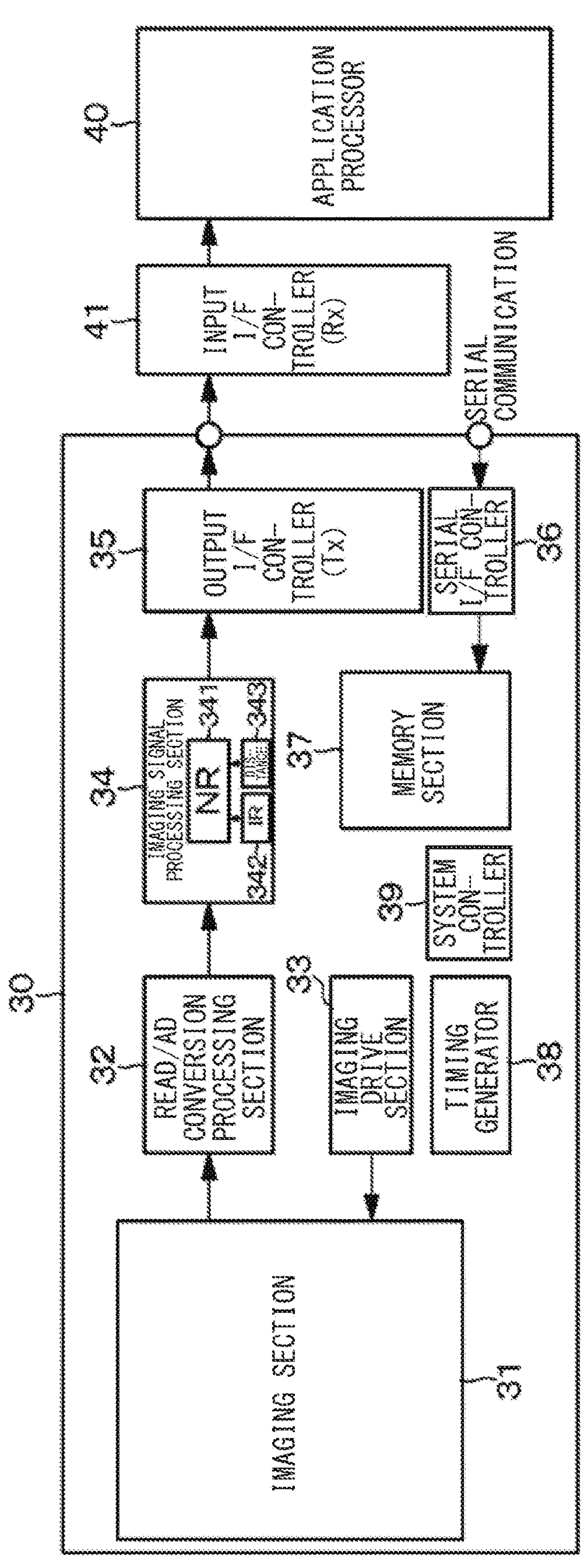
[FIG. 15]

[FIG. 16]
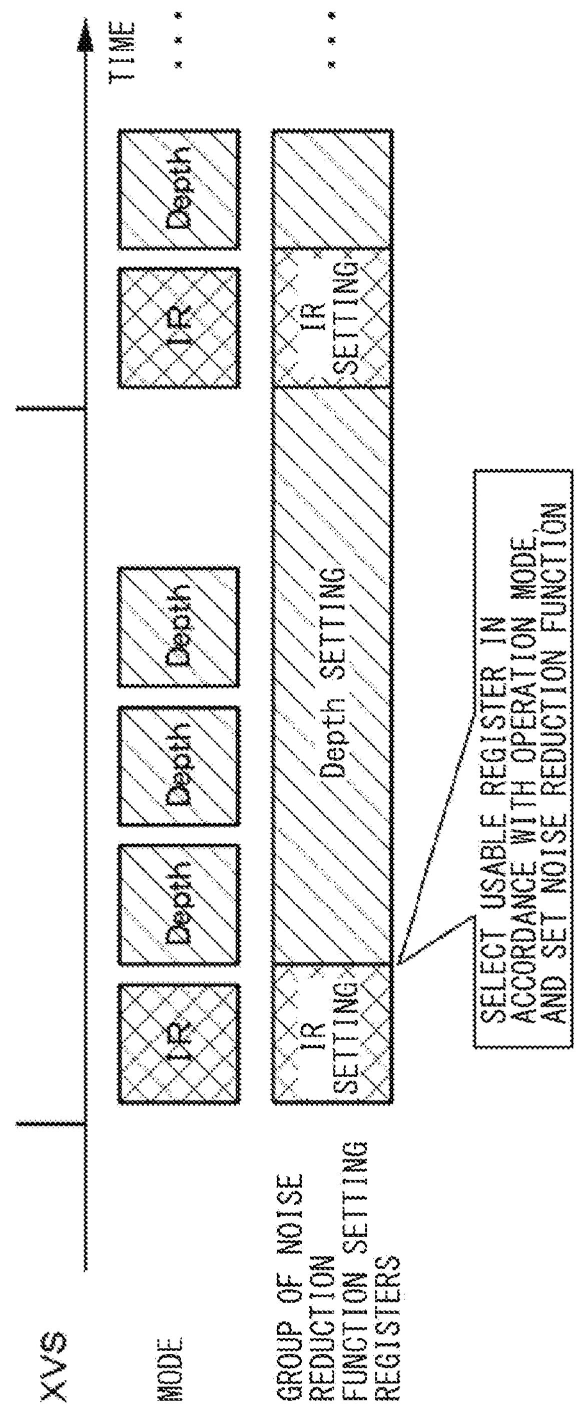

[FIG. 17A]
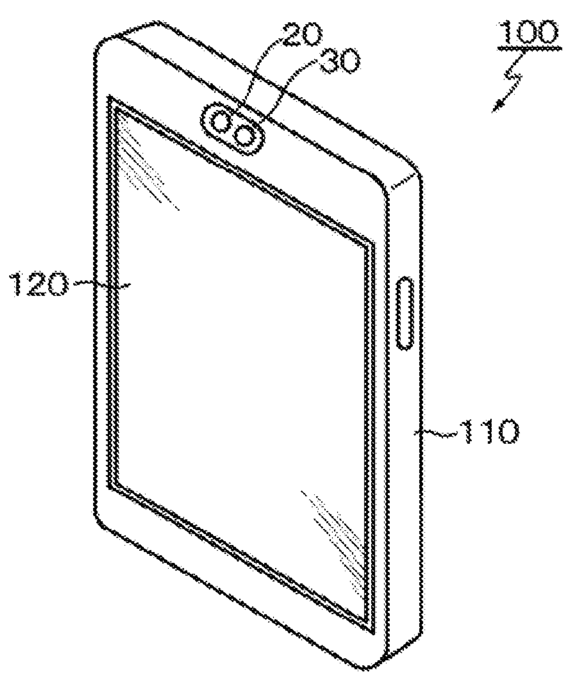
[FIG. 17B]
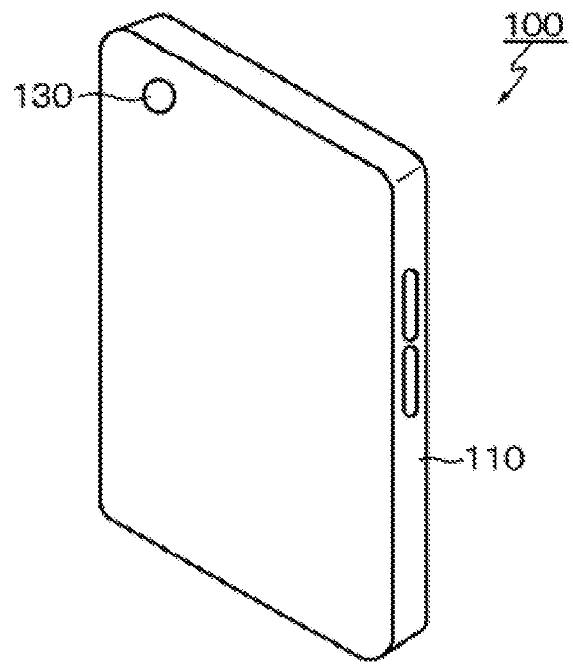

LIGHT RECEIVING DEVICE, METHOD OF CONTROLLING LIGHT RECEIVING DEVICE, AND ELECTRONIC APPARATUS

CROSS REFERENCE TO RELATED APPLICATIONS

This application is a U.S. National Phase of International Patent Application No. PCT/JP2020/043137 filed on Nov. 19, 2020, which claims priority benefit of Japanese Patent Application No. JP 2019-234076 filed in the Japan Patent Office on Dec. 25, 2019. Each of the above-referenced applications is hereby incorporated herein by reference in its entirety.

TECHNICAL FIELD

The present disclosure relates to a light receiving device, a method of controlling a light receiving device, and an electronic apparatus.

BACKGROUND ART

In recent years, mobile terminals, such as smartphones, incorporating a face authentication system as one of personal authentication systems have been widely used. In order to read accurate data of a face, the face authentication system performs, for example, a process of acquiring a three-dimensional (3D) image such as facial irregularities, that is, a distance map image (a depth map image). In order to acquire the distance map image, a mobile terminal such as a smartphone incorporates a distance measurement sensor that measures a distance to a face as a subject.

Incidentally, a mobile terminal such as a smartphone uses a battery as an operation power source of the mobile terminal; therefore, reduction in power consumption of the mobile terminal is desired. For this reason, a proximity sensor (a short distance sensor) is incorporated in a mobile terminal to perform ON/OFF switching of a touch panel display on the basis of, for example, information about whether or not the face of a user approaches the mobile terminal, thereby cutting down on power consumption of the mobile terminal (see PTL 1, for example).

CITATION LIST

Patent Literature

PTL 1: Japanese Unexamined Patent Application Publication No. 2014-027386

SUMMARY OF THE INVENTION

Problem to be Solved by the Invention

With an existing technique described in PTL 1 above, it is possible to achieve reduction in power consumption of a mobile terminal; however, incorporation of a proximity sensor in addition to a distance measurement sensor increases the number of components, and involves securing of a dedicated space for placement thereof, resulting in hindrance to downsizing of the mobile terminal and also an increase in price of the mobile terminal.

An object of the present disclosure is to provide a light receiving device having a function as a proximity sensor in addition to a function of acquiring a distance map image (a depth map image), a method of controlling the light receiving device, and an electronic apparatus including the light receiving device.

Means for Solving the Problem

A light receiving device of the present disclosure to achieve the above-described object includes:

an imaging section in which a pixel including a light receiving element is disposed;

a read processing section that reads a pixel signal from the imaging section;

a signal processing section that executes predetermined signal processing on the pixel signal read by the read processing section; and a system controller.

The light receiving device has a short distance mode that is freely settable.

The system controller has a function of calculating, when the short distance mode is set, a distance to a distance measurement target with use of the pixel signal in a partial region within a pixel region of the imaging section, and a function of determining whether or not the distance calculated satisfies a detection condition that is set in advance.

A method of controlling a light receiving device of the present disclosure to achieve the above-described object is a method of controlling a light receiving device that includes:

an imaging section in which a pixel including a light receiving element is disposed;

a read processing section that reads a pixel signal from the imaging section; and a signal processing section that executes predetermined signal processing on the pixel signal read by the read processing section, the light receiving device having a short distance mode that is freely settable.

The method includes calculating, when the short distance mode is set, a distance to a distance measurement target with use of the pixel signal in a partial region within a pixel region of the imaging section, and determining whether or not the distance calculated satisfies a detection condition that is set in advance.

An electronic apparatus of the present disclosure to achieve the above-described object includes a light source unit, and a light receiving device.

The light receiving device includes:

an imaging section in which a pixel including a light receiving element is disposed;

a read processing section that reads a pixel signal from the imaging section;

a signal processing section that executes predetermined signal processing on the pixel signal read by the read processing section; and a system controller.

The light receiving device has a short distance mode that is freely settable.

The system controller has a function of calculating, when the short distance mode is set, a distance to a distance measurement target with use of the pixel signal in a partial region within a pixel region of the imaging section, and a function of determining whether or not the distance calculated satisfies a detection condition that is set in advance.

BRIEF DESCRIPTION OF THE DRAWINGS

FIG. 1 is a conceptual diagram of a distance measurement system that adopts a ToF scheme.

FIG. 2 is a block diagram illustrating an example of a system configuration of a light receiving device serving as a precondition for the present disclosure.

FIG. 3 is a block diagram illustrating an example of a configuration of an imaging section and its peripheral circuits in the light receiving device.

FIG. 4 is a circuit diagram illustrating an example of a circuit configuration of a pixel in the imaging section.

FIG. 5 is a timing waveform diagram for describing calculation of a distance by an indirect ToF scheme.

FIG. 6 is a block diagram illustrating an example of a system configuration of a light receiving device according to Example 1.

FIG. 7 is a timing chart of a basic operation of a short distance mode.

FIG. 8 is a timing chart of a standby mode when a detection condition is met.

FIG. 9 is an exploded perspective diagram illustrating a chip structure of the light receiving device according to Example 1.

FIGS. 10A and 10B are diagrams describing setting of a target region for distance calculation.

FIG. 11 is a flowchart illustrating a flow of processes related to a method of controlling a light receiving device according to Example 2.

FIGS. 12A and 12B are diagrams describing a process of determining whether or not a calculated distance value meets the detection condition.

FIG. 13 is a block diagram illustrating an example of a system configuration of a light receiving device according to Example 3.

FIG. 14 is a diagram describing a disadvantage of a case of dynamically switching settings of a noise reduction function in accordance with mode from an external host.

FIG. 15 is a block diagram illustrating an example of a system configuration of a light receiving device according to Example 4.

FIG. 16 is a diagram describing settings of the noise reduction function performed inside the light receiving device according to Example 4.

FIG. 17A is an external view of a smartphone according to a specific example of an electronic apparatus of the present disclosure as viewed from a front side, and FIG. 17B is an external view of the smartphone as viewed from a back side.

MODES FOR CARRYING OUT THE INVENTION

Modes for carrying out the technology of the present disclosure (hereinafter referred to as "embodiments") are described in detail below with reference to the drawings. The technology of the present disclosure is not limited to the embodiments, and various numerical values and the like in the embodiments are illustrative. In the following description, the same components, or components having the same function are denoted by the same reference signs, and redundant description is omitted. It is to be noted that description is given in the following order.

1. Overall Description of Light Receiving Device, Method of Controlling Light Receiving Device, and Electronic Apparatus of Present Disclosure
2. Distance Measurement System Adopting ToF Scheme
3. Light Receiving Device Serving as Precondition for Present Disclosure
    3-1. System Configuration
    3-2. Configuration Example of Imaging Section
    3-3. Circuit Configuration Example of Pixel
    3-4. Regarding Calculation of Distance by Indirect ToF Scheme
4. Embodiment of Present Disclosure
    4-1. Example 1 (An example of a light receiving device usable as a proximity sensor)
        4-1-1. System Configuration
        4-1-2. Configuration Example of Stacked-type Chip Structure
        4-1-3. Regarding Setting of Target Region for Distance Calculation
    4-2. Example 2 (An example of processing in a case where a short distance mode is set)
    4-3. Example 3 (A modification example of Example 1: an example of operation during a vertical blanking period)
    4-4. Example 4 (An example in which the light receiving device internally has a function of dynamically switching settings of an NR function in accordance with mode)
5. Modification Examples
6. Electronic Apparatus of Present Disclosure (An example of a smartphone)
7. Possible Configurations of Present Disclosure <Overall Description of Light Receiving Device, Method of Controlling Light Receiving Device, and Electronic Apparatus of Present Disclosure>

In a light receiving device, a method of controlling the light receiving device, and an electronic apparatus of the present disclosure, a system controller may be configured to, when calculating a distance and determining whether or not a detection condition is satisfied, stop output of a pixel signal to outside the light receiving device through a signal processing section. In addition, the system controller may be configured to stop the output of the pixel signal to outside the light receiving device by stopping supply of power to the signal processing section, or to stop the output of the pixel signal to outside the light receiving device by stopping supply of a clock to the signal processing section.

The light receiving device, the method of controlling the light receiving device, and the electronic apparatus of the present disclosure including the preferred configurations described above may have a configuration including a pixel integrator that integrates pixel values in a partial region within a pixel region of the imaging section, and the system controller may be configured to calculate a distance to a distance measurement target with use of a result of the integration by the pixel integrator. Further, the pixel integrator may be configured to integrate the pixel values in the partial region within the pixel region of the imaging section for a number of frames necessary for calculating the distance to the distance measurement target.

Further, in the light receiving device, the method of controlling the light receiving device, and the electronic apparatus of the present disclosure including the preferred configurations described above, the detection condition may be a distance value that is set in advance, and where an upper limit and a lower limit are set for the distance value as the detection condition, the system controller may be configured to determine that the detection condition is satisfied where a calculated distance value falls within a range between the upper limit and the lower limit, both inclusive, that are set for the distance value. Alternatively, where the upper limit and the lower limit are set for the distance value as the detection condition, the system controller may be configured to determine that the detection condition is satisfied where the calculated distance value falls outside the range between the upper limit and the lower limit, both inclusive, that are set for the distance value.

Further, in the light receiving device, the method of controlling the light receiving device, and the electronic apparatus of the present disclosure including the preferred configurations described above, the system controller may be configured to stop supply of power to a circuit system including the read processing section during a vertical blanking period.

Further, in the light receiving device, the method of controlling the light receiving device, and the electronic apparatus of the present disclosure including the preferred configurations described above, the signal processing section may have a configuration including a noise reduction circuit that performs a noise reduction process on the pixel signal read by the read processing section. Further, as operation modes of the light receiving device, an infrared light mode for acquiring an image based on infrared light and a distance mode for acquiring a distance map image are settable, and the signal processing section may have a configuration including a first register that sets a relatively weak noise reduction function on the noise reduction circuit when in the infrared light mode, and a second register that sets a relatively intense noise reduction function on the noise reduction circuit when in the distance mode. Further, the system controller may be configured to select the first register or the second register in accordance with the operation mode of the light receiving device and to switch intensity settings of the noise reduction function on the noise reduction circuit.

<Distance Measurement System Adopting ToF Scheme>

One of distance measurement systems for measuring a distance to a distance measurement target (a subject) is a system adopting a ToF scheme that measures a time for light emitted toward the distance measurement target to be reflected back from the distance measurement target, that is, a time of flight (Time of Flight).

FIG. 1 illustrates a conceptual diagram of the distance measurement system that adopts the ToF scheme. In order to achieve distance measurement by the ToF scheme, a distance measurement system 1 has a configuration including a light source unit 20 that emits light (for example, laser light having a peak wavelength in an infrared wavelength region) to irradiate a subject 10 therewith, and a light receiving device 30 that receives reflected light reflected back from the subject 10. The light receiving device 30 is a ToF sensor that adopts the ToF scheme and measures the time of flight for the reflected light for reception to be reflected back from the distance measurement target.

<Light Receiving Device Serving as Precondition for Present Disclosure>

[System Configuration]

FIG. 2 is a block diagram illustrating an example of a system configuration of the light receiving device 30 serving as a precondition for the present disclosure. FIG. 2 illustrates an application processor 40 and an input I/F (interface) controller 41 in addition to the light receiving device 30. The distance measurement system 1 includes the light source unit 20, the light receiving device 30, and the application processor 40.

The light receiving device 30 includes an imaging section (a pixel array section) 31 in which pixels including light receiving elements (photoelectric conversion elements) to be described later are disposed in a matrix form (an array form). The light receiving device 30 includes, in addition to the imaging section 31, a read/AD (analog-to-digital) conversion processing section 32, an imaging drive section 33, an imaging signal processing section 34, an output I/F controller 35, a serial I/F controller 36, a memory section 37, a timing generator 38, and a system controller 39, as peripheral circuits of the imaging section 31. The system controller 39 includes, for example a CPU (Central Processing Unit).

In the distance measurement system 1 including the light receiving device 30, pulsed light with a predetermined period emitted from the light source unit 20 is reflected off a distance measurement target (a subject), and the reflected pulsed light is received by the light receiving device 30. Then, the light receiving device 30 detects a period of the reflected pulsed light at the time when the light receiving device 30 receives the reflected pulsed light, and measures the time of flight of the light on the basis of a phase difference between the period at light emission and the period at light reception to thereby measure the distance to the distance measurement target. This distance measurement scheme is an indirect (indirect) ToF scheme. The light receiving device 30 according to this example adopts the indirect ToF scheme.

In the light receiving device 30, under driving by the imaging drive section 33, a pixel signal read from each pixel of the imaging section 31 through the read/AD conversion processing section 32 is outputted to outside the light receiving device 30 in units of imaging frames through the imaging signal processing section 34 and the output I/F controller 35, and is supplied to the application processor 40 through the input I/F controller 41. On the basis of the pixel signals for a plurality of frames outputted from the light receiving device 30, the application processor 40 is able to detect distance information for each pixel and to acquire a distance map (Depth Map: depth map) image .

[Configuration Example of Imaging Section]

Now, a description will be given of a configuration example of the imaging section 31 of the light receiving device 30 with reference to FIG. 3. FIG. 3 is a block diagram illustrating an example of a configuration of the imaging section 31 and its peripheral circuits in the light receiving device 30.

The imaging section 31 includes a pixel array section in which a plurality of pixels 51 is two-dimensionally arranged in a matrix form (an array form). In the imaging section 31, the plurality of pixels 51 each receives incident light (for example, near-infrared light), and performs photoelectric conversion of the incident light to output an analog pixel signal. Two vertical signal lines $VSL_1$ and $VSL_2$ are wired to each pixel column of the imaging section 31. A total of (2×M) vertical signal lines VSL is wired in the imaging section 31, where M (M is an integer) is the number of the pixel columns of the imaging section 31.

The plurality of pixels 51 each includes a first tap A and a second tap B (to be described in detail later). An analog pixel signal $AIN_{P1}$ based on electric charge of the first tap A of the pixel 51 in a corresponding pixel column is outputted to the vertical signal line $VSL_1$ of the two vertical signal lines $VSL_1$ and $VSL_2$. Further, an analog pixel signal $AIN_{P2}$ based on electric charge of the second tap B of the pixel 51 in the corresponding pixel column is outputted to the vertical signal line $VSL_2$. The analog pixel signals $AIN_{P1}$ and $AIN_{P2}$ will be described later.

Of the peripheral circuits of the imaging section 31, the imaging drive section 33 is a row selector that drives the pixels 51 of the imaging section 31 in units of pixel rows to cause the pixels 51 to output the pixel signals $AIN_{P1}$ and $AIN_{P2}$. That is, the analog pixel signals $AIN_{P1}$ and $AIN_{P2}$ outputted from the pixels 51 in a selected row are supplied to the read/AD conversion processing section 32 through the two vertical signal lines $VSL_1$ and $VSL_2$ under driving by the imaging section 31.

The read/AD conversion processing section 32 is a column signal processing section that includes a plurality of AD (analog-to-digital) converters 52 provided, for example, for each pixel column in correspondence with the pixel columns of the imaging section 31. In the read/AD conversion processing section 32, the AD converters 52 perform analog-to-digital conversion processing on the analog pixel signals $AIN_{P1}$ and $AIN_{P2}$ supplied through the vertical signal lines $VSL_1$ and $VSL_2$.

The digitized pixel signals $AIN_{P1}$ and $AIN_{P2}$ outputted from the read/AD conversion processing section 32 are supplied to the imaging signal processing section 34 illustrated in FIG. 2 through an output circuit section 53. The imaging signal processing section 34 performs predetermined signal processing such as CDS (Correlated Double Sampling: correlated double sampling) processing on the digitized pixel signals $AIN_{P1}$ and $AIN_{P2}$, and thereafter outputs the digitized pixel signals $AIN_{P1}$ and $AIN_{P2}$ to outside the light receiving device 30 through the output I/F controller 35.

The timing generator 38 generates various types of timing signals, clock signals, control signals, and the like, and performs driving control on the imaging drive section 33, the read/AD conversion processing section 32, the output circuit section 53, and the like on the basis of these signals.

[Circuit Configuration Example of Pixel]

FIG. 4 is a circuit diagram illustrating an example of a circuit configuration of the pixel 51 in the imaging section 31.

The pixel 51 according to this example includes, for example, a photodiode 511 as the light receiving element (photoelectric conversion element). The pixel 51 has a configuration including an overflow transistor 512, two transfer transistors 513 and 514, two reset transistors 515 and 516, two floating diffusion layers 517 and 518, two amplification transistors 519 and 520, and two selection transistors 521 and 522, in addition to the photodiode 511. The two floating diffusion layers 517 and 518 correspond to the first and second taps A and B (which may hereinafter be simply referred to as "taps A and B") illustrated in FIG. 3 described above.

The photodiode 511 photoelectrically converts received light to generate electric charge. The photodiode 511 may have, for example, a back illuminated type pixel configuration which captures light applied from a back surface side of a substrate. However, the pixel configuration is not limited to the back illuminated type pixel configuration, and may be a front illuminated type pixel configuration which captures light applied from a front surface side of the substrate.

The overflow transistor 512 is coupled between a cathode electrode of the photodiode 511 and a power supply line of a power supply voltage $V_{DD}$, and has a function of resetting the photodiode 511. Specifically, the overflow transistor 512 comes into conduction in response to an overflow gate signal OFG supplied from the imaging drive section 33 to thereby sequentially discharge electric charge of the photodiode 511 to the power supply line of the power supply voltage $V_{DD}$.

The two transfer transistors 513 and 514 are coupled between the cathode electrode of the photodiode 511 and the two floating diffusion layers 517 and 518 (the taps A and B), respectively. The transfer transistors 513 and 514 then come into conduction in response to a transfer signal TRG supplied from the imaging drive section 33 to thereby sequentially transfer electric charge generated by the photodiode 511 to the floating diffusion layers 517 and 518, respectively.

The floating diffusion layers 517 and 518 corresponding to the first and second taps A and B accumulate the electric charge transferred from the photodiode 511, and convert the electric charge into voltage signals having a voltage value corresponding to the amount of the electric charge to thereby generate the analog pixel signals $AIN_{P1}$ and $AIN_{P2}$.

The two reset transistors 515 and 516 are respectively coupled between the two floating diffusion layers 517 and 518 and the power supply line of the power supply voltage $V_{DD}$. The reset transistors 515 and 516 then come into conduction in response to a reset signal RST supplied from the imaging drive section 33 to extract electric charge from the floating diffusion layers 517 and 518, respectively, thereby initializing the amount of electric charge.

The two amplification transistors 519 and 520 are coupled between the power supply line of the power supply voltage $V_{DD}$ and the two selection transistors 521 and 522, respectively, and amplify respective voltage signals resulting from conversion of electric charge into respective voltages at the floating diffusion layers 517 and 518.

The two selection transistors 521 and 522 are respectively coupled between the two amplification transistors 519 and 520 and the respective vertical signal lines $VSL_1$ and $VSL_2$. The selection transistors 521 and 522 then come into conduction in response to a selection signal SEL supplied from the imaging drive section 33 to thereby output the respective voltage signals amplified by the amplification transistors 519 and 520 as the analog pixel signals $AIN_{P1}$ and $AIN_{P2}$ to the two vertical signal lines $VSL_1$ and $VSL_2$.

The two vertical signal lines $VSL_1$ and $VSL_2$ are coupled to an input end of one analog-to-digital converter 52 in the read/AD conversion processing section 32 for each pixel column, and transmit the analog pixel signals $AIN_{P1}$ and $AIN_{P2}$ outputted from the pixels 51 for each pixel column to the analog-to-digital converter 52.

It is to be noted that as long as the pixel 51 has a circuit configuration that is able to generate the analog pixel signals $AIN_{P1}$ and $AIN_{P2}$ by photoelectric conversion, the circuit configuration of the pixel 51 is not limited to the one illustrated in FIG. 3 as an example.

[Regarding Calculation of Distance by Indirect ToF Scheme]

Now, a description will be given of calculation of a distance by the indirect ToF scheme with reference to FIG. 5. FIG. 5 is a timing waveform diagram for describing calculation of a distance by the indirect ToF scheme. The light source unit 20 and the light receiving device 30 in the distance measurement system 1 illustrated in FIG. 1 operate at timings illustrated in the timing waveform diagram in FIG. 5.

The light source unit 20 irradiates the distance measurement target with the pulsed light only during a predetermined period, e.g., a period of a pulsed light emission time $T_p$. The pulsed light emitted from the light source unit 20 is reflected back from the distance measurement target. The reflected pulsed light is received by the photodiode 511. A time from start of irradiation of the distance measurement target with the pulsed light to reception of the reflected pulsed light by the photodiode 511, that is, the time of flight of the light is a time corresponding to the distance from the distance measurement system 1 to the distance measurement target.

In FIG. 4, the photodiode 511 receives the reflected pulsed light from the distance measurement target only during the period of the pulsed light emission time $T_p$ from a point in time when irradiation with the pulsed light starts. Upon a single time of light reception, electric charge photoelectrically converted by the photodiode 511 is transferred to and accumulated in the tap A (the floating diffusion layer 517).

Then, a signal no having a voltage value corresponding to the amount of the electric charge accumulated in the floating diffusion layer 517 is obtained from the tap A. At a point in time when an accumulation timing of the tap A ends, electric charge photoelectrically converted by the photodiode 511 is transferred to and accumulated in the tap B (the floating diffusion layer 518). Then, a signal $n_1$ having a voltage value corresponding to the amount of the electric charge accumulated in the floating diffusion layer 518 is obtained from the tap B.

In such a manner, the signal no and the signal $n_1$ are obtained by performing driving in which respective phases of accumulation timings are different by 180 degrees (driving in which the phases are completely opposite) on the tap A and the tap B. Then, such driving is repeated a plurality of times, and accumulation and integration of the signal no and the signal $n_1$ are performed to thereby acquire an accumulation signal $N_0$ and an accumulation signal $N_1$, respectively.

For example, in one pixel 51, light reception is performed twice per phase, and signals are accumulated four times in each of the tap A and the tap B. That is, signals of 0 degrees, 90 degrees, 180 degrees, and 270 degrees are accumulated in each of the tap A and the tap B. It is possible to calculate a distance D to the distance measurement target on the basis of the accumulation signal $N_0$ and the accumulation signal $N_1$ that are thus acquired.

The accumulation signal $N_0$ and the accumulation signal $N_1$ include not only a component of the reflected light (active light) reflected back from the distance measurement target but also a component of ambient light (ambient light) reflected and scattered by an object, air, and the like. Accordingly, in the above-described operations, in order to remove an influence of the component of the ambient light and leave the component of the reflected light, accumulation and integration are performed on a signal $n_2$ based on the ambient light to thereby acquire an accumulation signal $N_2$ relating to the component of the ambient light.

It is possible to calculate the distance D to the distance measurement target by arithmetic processing based on Equations (1) and (2) below with use of the accumulation signal $N_0$ and the accumulation signal $N_1$ each including the component of the ambient light, and the accumulation signal $N_2$ relating to the component of the ambient light that are acquired in such a manner.

[Math. 1]

$$\Delta\phi = \frac{N_0 - N_2}{N_0 + N_1 - 2 \cdot N_2} \tag{1}$$

[Math. 2]

$$D = \frac{c \cdot T_p}{2}\left(1 - \frac{\Delta\phi}{2\pi}\right) \tag{2}$$

In Equations (1) and (2), D represents the distance to the distance measurement target, c represents speed of the light, and $T_p$ represents the pulsed light emission time.

The arithmetic processing for calculating the distance D is executed by the application processor 40 at a subsequent stage of the light receiving device 30. That is, the application processor 40 is able to calculate the distance D to the distance measurement target by the arithmetic processing based on Equations (1) and (2) above with use of the accumulation signal $N_0$ and the accumulation signal $N_1$ that each include the component of the ambient light, and the accumulation signal $N_2$ relating to the component of the ambient light. The application processor 40 is further able to acquire a distance map image on the basis of the pixel signals for a plurality of frames outputted from the light receiving device 30.

As described above, the indirect ToF scheme is a scheme to calculate distance information on the basis of the ratio of pixel signals exposed to the reflected light from a subject (distance measurement target). Then, the light receiving device 30 adopting the indirect ToF scheme performs a process of outputting the pixel signals of, for example, multiple pixels such as VGA (Video Graphics Array) for a plurality of frames through a high-speed communication interface such as an MIPI. The pixel signals for the plurality of frames outputted from the light receiving device 30 are converted into the distance map image through signal processing by the application processor 40 at the subsequent stage of the light receiving device 30.

Incidentally, while it is possible to acquire a distance map image with use of the light receiving device 30, there are cases where it is desired not only to acquire a distance map image but also to acquire simple distance information such as information about how far a distance to an object is, or cases where it is desired to determine whether or not an object is present within a specific distance range. In the case where it is desired to acquire simple distance information, not all pixel signals for a plurality of frames are necessary, unlike the case of acquiring a distance map image. In other words, it is possible to acquire simple distance information or the like with use of pixel signals in a partial region of the imaging section 31.

However, according to the light receiving device 30 serving as the precondition for the present disclosure described above, all pixel signals for a plurality of frames are to be outputted to the application processor 40 through a high-speed communication interface such as an MIPI even in the case where it is desired to acquire simple distance information or the like. Accordingly, upon receiving the pixel signals from the light receiving device 30, the application processor 40 at the subsequent stage has to perform a process of converting the pixel signals into the distance information. In this case, power consumption of the light receiving device 30 and a processing load and power consumption of the application processor 40 become a concern.

<Embodiments of Present Disclosure>

An embodiment of the present disclosure is configured to allow for setting of a short distance (proximity) mode by a user in the case where it is desired to acquire simple distance information such as information about how far a distance to an object is, or the case where it is desired to determine whether or not an object is present within a specific distance range. In the present embodiment, the light receiving device 30 internally has a function of, in a case where the short distance mode is set, specifying a partial region of the imaging section 31 as a target region for distance calculation and calculating distance information to the distance measurement target with use of pixel signals in the target region, and a function of determining whether or not the calculated distance satisfies a detection condition that is set in advance.

In addition, in the present embodiment, while calculation of the distance information and determination on the detection condition are performed inside the light receiving device 30, output of information for generating a distance map image is stopped by the light receiving device 30 which outputs to the application processor 40 the information necessary for the application processor 40 to generate a distance map image. Specifically, the output of the information for generating a distance map image is stoppable by stopping supply of power or stopping supply of a clock to a circuit system that performs predetermined signal processing on the pixel signals read from the imaging section 31.

By allowing the light receiving device 30 to internally have the calculation function for distance information and the determination function on the detection condition as described above, the light receiving device 30 have equivalent functions to those of a proximity sensor. In other words, the light receiving device 30 for generating a distance map image becomes usable as a proximity sensor. Furthermore, when the short distance mode is set, operations of circuit portions other than the circuit portions that perform calculation of distance information and determination on the detection condition with use of the pixel signals after being read from the imaging section 31 may be caused to stop. This makes it possible to achieve reduction in power consumption of the light receiving device 30 and also lightening of processing load and reduction in power consumption of the application processor 40.

A description will be given below of specific examples of the light receiving device 30 according to the present embodiment.

EXAMPLE 1

Example 1 is an example of the light receiving device 30 that is usable as a proximity sensor.

(System Configuration)

FIG. 6 is a block diagram illustrating an example of a system configuration of the light receiving device 30 according to Example 1. FIG. 6 illustrates the application processor 40 and the input I/F controller 41 in addition to the light receiving device 30. The distance measurement system 1 includes the light source unit 20, the light receiving device 30, and the application processor 40.

The light receiving device 30 according to Example 1 has a configuration including a pixel integrator 42 and a power supply controller 43 in addition to the imaging section 31, the read/AD conversion processing section 32, the imaging drive section 33, the imaging signal processing section 34, the output I/F controller 35, the serial I/F controller 36, the memory section 37, the timing generator 38, and the system controller 39.

In addition, the light receiving device 30 according to Example 1 has a short distance (Proximity sensing) mode that is freely settable externally by a user. The short distance mode is freely settable by a user in the case where it is desired to acquire simple distance information such as information about how far a distance to an object is, the case where it is desired to determine whether or not an object is present within a specific distance range, or the like.

The pixel integrator 42 integrates pixel values in a partial region within an imaging region of the imaging section 31 (in a target region for distance calculation), e.g., in a specified rectangular region read by the read/AD conversion processing section 32, which is an example of the read processing section, for a number of frames necessary for calculating the distance to the distance measurement target. The number of frames necessary for calculating the distance is, for example, four frames corresponding to phases of accumulation timings of 0 degrees, 90 degrees, 180 degrees, and 270 degrees for the tap A and the tap B in FIG. 4.

A result of the integration by the pixel integrator 42 is supplied to the system controller 39. The system controller 39 includes, for example, a CPU, and has a function of calculating distance information (a distance value) to the distance measurement target with use of the result of the integration by the pixel integrator 42, and a function of determining whether or not the calculated distance information satisfies a detection condition that is set in advance.

Specifically, the system controller 39 calculates the distance information to the distance measurement target with use of the result of the integration by the pixel integrator 42, that is, a pixel value integrated for a plurality of frames. N pieces of most recent distance information (distance values) calculated by the system controller 39 are written into a distance information storage (region) of the memory section 37. The distance information written into the memory section 37 is readable through the serial I/F controller 36.

The system controller 39 determines whether or not the calculated distance value (distance information) meets the detection condition that is set in advance, and in a case where the detection condition is met, the system controller 39 provides an interrupt notification to outside the light receiving device 30, specifically, to the application processor 40. Here, the detection condition is a distance (a distance value) that is set in advance. With regard to the interrupt, mask setting is possible, and waiting for detection by polling is also possible.

As described above, the light receiving device 30 according to Example 1 internally has the calculation function for distance information and the determination function on the detection condition that are to be executed by the system controller 39. The system controller 39 performs control to bring the power supply controller 43 into an operating state when performing calculation of the distance information and determination on the detection condition. The power supply controller 43 stops supply of the power supply voltage $V_{DD}$ to a power supply island A of a circuit system that performs predetermined signal processing on the pixel signal read by the read/AD conversion processing section 32 from the imaging section 31, specifically, a circuit system including the imaging signal processing section 34 and the output I/F controller 35, by turning off (opening) a power supply switch $SW_1$.

In such a manner, by stopping supply of power to the power supply island A of the circuit system including the imaging signal processing section 34 and the output I/F controller 35 under the control by the system controller 39 when performing calculation of the distance information and determination on the detection condition, it is possible to stop the output of the pixel signals for a plurality of frames to outside the light receiving device 30. As a result, it is possible to achieve reduction in power consumption of the light receiving device 30 and also lightening of processing load and reduction in power consumption of the application processor 40.

FIG. 7 illustrates a timing chart of a basic operation of the short distance mode, and FIG. 8 illustrates a timing chart of a standby mode when the detection condition is met. In integrating the pixel values, imaging of four frames (Phases 0 to 3) necessary for distance calculation is performed. Integration of the pixel values for the four frames is performed by the pixel integrator 42, and the distance calculation is performed by the system controller 39 on the basis of an integrated pixel value. Then, after the distance calculation by the system controller 39, power supply to the power supply island A of the circuit system including the imaging signal processing section 34 and the output I/F controller 35 is stopped. In a case of this example, as one example, a period of the imaging for the four frame and the distance calculation is approximately 3.5 milliseconds, and a period of power off is approximately 96.5 milliseconds (a value when an exposure time is set to 500 milliseconds in a case of 10 fps).

It is to be noted that in Example 1, output of the pixel signals for a plurality of frames to outside the light receiving device 30 is stopped by stopping supply of power to the power supply island A of a circuit system; however, stopping supply of a clock to the circuit system also makes it possible to stop the output of the pixel signals for a plurality of frames to outside the light receiving device 30.

Further, as illustrated in FIG. 6, turning off (opening) a power supply switch $SW_2$ makes it possible to stop supply of the power supply voltage $V_{DD}$ also to the input I/F controller 41 outside the light receiving device 30. It is thereby possible to achieve reduction in power consumption of the entire distance measurement system 1 including the application processor 40 and the input I/F controller 41.

(Configuration Example of Stacked-type Chip Structure)

A chip structure of the light receiving device 30 according to Example 1 may be, as illustrated in FIG. 9, a stacked-type chip structure including a sensor chip 61 and a circuit chip 62 stacked on the sensor chip 61. On the sensor chip 61, the imaging section 31 is disposed. On the circuit chip 62, logic/analog circuits, including the read/AD conversion processing section 32, the imaging drive section 33, the imaging signal processing section 34, the memory section 37, the timing generator (TG) 38, and the system controller 39, are disposed. In this stacked-type chip structure, the sensor chip 61 and the circuit chip 62 are electrically coupled to each other through a coupling section (not illustrated) such as a via (VIA) or Cu—Cu bonding.

(Regarding Setting of Target Region for Distance Calculation)

Now, a description will be given of a specified region having, for example, a rectangular shape that is to be set as a target region for distance calculation in the imaging section 31.

Regarding the target region (specified region) for distance calculation, in a case where a location of the distance measurement target is known, it is possible specify the target region for distance calculation by specifying coordinates (X_POS, Y_POS) and a region size in the pixel region of the imaging section 31, as illustrated in FIG. 10A. It is possible to achieve improvement in SN ratio by integrating pixel values in the target region (the specified region) for distance calculation at the pixel integrator 42 illustrated in FIG. 6 and performing distance calculation at the system controller 39 with use of the integrated value.

In a case where the location of the distance measurement target is unclear, it is possible to specify the target region for distance calculation by scanning a specified region which is the target region for distance calculation in predetermined steps (X_STEP, Y_STEP), as illustrated in FIG. 10B, in the pixel region of the imaging section 31. In this case also, it is possible to achieve improvement in SN ratio by integrating the pixel values in the specified region and performing distance calculation with use of the integrated value.

EXAMPLE 2

Example 2 is a process example relating to a method of controlling the light receiving device 30 according to Example 1, and is a process example in a case where the short distance mode is set by a user. A flow of processes relating to the method of controlling the light receiving device 30 according to Example 2 will be described with reference to a flowchart in FIG. 11.

In a case where the system controller 39 includes a CPU, processes in the case where the short distance mode is set are executed under the control by the CPU.

Upon being powered on (ON) and starting to be supplied with a clock from the timing generator 38, the CPU included in the system controller 39 (hereinafter, simply referred to as "CPU") comes into a standby state (step S11), and waits for exit from the standby state (step S12). Then, if the standby state is exited (YES in S12), the CPU determines whether or not the short distance mode is set by the user (step S13), and if the short distance mode is not set (NO in S13), the CPU causes a series of processes for the short distance mode to end in order to proceed to a process of generating a distance map image.

In a case where the CPU determines that the short distance mode is set (YES in S13), the CPU controls the imaging section 31 to perform imaging for a number of frames necessary for calculating a distance to a distance measurement target (step S14). Subsequently, the CPU controls the pixel integrator 42 to integrate pixel values in a partial region (in the target region for distance measurement) within the pixel region of the imaging section 31 for the plurality of frames (step S15).

Next, the CPU acquires the integrated pixel value (step S16), and then calculates a distance value to the distance measurement target on the basis of the acquired integrated value (step S17). Subsequently, the CPU stops, through the power supply controller 43, supply of power to a circuit portion unnecessary for calculation of the distance, specifically, the circuit portion including the imaging signal processing section 34 and the output I/F controller 35 (step S18), and then determines whether or not the calculated distance value meets the detection condition, that is, a distance that is set in advance (step S19).

If the calculated distance value does not meet the detection condition (NO in S19), the CPU waits for elapse of a time corresponding to one frame (step S20), and after the elapse of the time corresponding to one frame (YES in S20), the CPU causes the process to return to step S14. If the calculated distance value meets the detection condition (YES in S19), the CPU notifies the application processor 40 of the distance information (the distance value) that meets the detection condition (step S21), and causes the series of processes for the short distance mode to end.

Now, with reference to FIGS. 12A and 12B, a description will be given of the process of step S19, that is, a process of determining whether or not the distance value calculated at step S17 meets the detection condition.

As the detection condition, an upper limit DEPTH_THR_HIGH and a lower limit DEPTH_THR_LOW may be set for the distance value, and a detection range may be specified by logical negation. In a case of FIG. 12A, it is possible to determine that the distance value meets the detection condition by detecting that the distance value calculated at step S17 falls within a range between the upper limit DEPTH_THR_HIGH and the lower limit DEPTH_THR_LOW both inclusive. In a case of FIG. 12B, it is possible to determine that the distance value meets the detection condition by detecting that the distance value calculated at step S17 falls outside the range between the upper limit DEPTH_THR_HIGH and the lower limit DEPTH_THR_LOW both inclusive.

It is to be noted that in order to achieve a stable determination process, it is desirable to have the following functions.

A function of generating an interrupt in a case where as many detection frames meeting the detection condition as the set number of frames are in succession A function of allowing a calculation value other than distance to be included in the detection condition Examples of the calculation value other than distance may include a confidence value (Confidence) and the number of saturated pixel values in the target region for distance calculation. The confidence value is a value representing an amount (an extent) of light that is emitted from the light source unit 20 and reflected back as reflected light from the distance measurement target to the light receiving device 30.

EXAMPLE 3

Example 3 is a modification example of Example 1, and is an example of operation during a vertical blanking period. FIG. 13 illustrates an example of a system configuration of a light receiving device according to Example 3.

Example 1 has a configuration in which, with a power supply group of the circuit system including the imaging signal processing section 34 and the output I/F controller 35 as the power supply island A, supply of the power supply voltage $V_{DD}$ to the power supply island A is stopped by turning off (opening) the power supply switch $SW_1$.

In contrast, Example 3 has a configuration in which, with a power supply group of a circuit system including the read/AD conversion processing section 32, the imaging drive section 33, and the pixel integrator 42 as a power supply island B, supply of the power supply voltage $V_{DD}$ to the power supply island B is stopped, during a vertical blanking period during which an interrupt of the start of a next frame is waited for, by turning off (opening) a power supply switch $SW_3$.

In Example 3, in addition to stopping supply of the power supply voltage $V_{DD}$ to the power supply island A as in Example 1, supply of the power supply voltage $V_{DD}$ to the power supply island B is stopped to thereby bring the circuit system including the read/AD conversion processing section 32, the imaging drive section 33, and the pixel integrator 42 into a non-operating state during the vertical blanking period. This makes it possible to achieve a further reduction in power consumption of the light receiving device 30. In a case of Example 3 also, as with Example 1, supply of the power supply voltage $V_{DD}$ to the input I/F controller 41 outside the light receiving device 30 may also be stopped.

Further, in the case of Example 3 also, as with Example 1, stopping supply of a clock to the circuit system including the read/AD conversion processing section 32, the imaging drive section 33, and the pixel integrator 42 also makes it possible to bring the circuit system including the read/AD conversion processing section 32, the imaging drive section 33, and the pixel integrator 42 into the non-operating state.

EXAMPLE 4

The light receiving device 30 adopting the indirect ToF scheme is usable also as an IR (Infrared: infrared light) sensor. In a case where an image based on infrared light (an IR image) is necessary for face authentication or the like, there is a use case in which some of a plurality of imaging frames are dynamically switched from a distance (Depth) mode for acquiring a distance map image to an IR mode. In that case, there is a possibility that settings of an NR (Noise Reduction: denoising) function, which is one of the functions of the imaging signal processing section 34, are dynamically switched in accordance with the mode.

In a case of dynamically switching the settings of the NR function in accordance with the mode, as illustrated in FIG. 14, it is difficult to change settings at appropriate timing from a host outside the light receiving device 30. Further, depending on the rate of the imaging frames, there is a possibility that direct switch setting is not possible for a reason related to communication time via a high-speed communication interface. If direct switch setting is not possible, then it is not possible to perform noise reduction appropriately, and thus a desired output image is not obtainable.

Example 4 is an example in which the light receiving device 30 internally has a function of dynamically switching the settings of the noise reduction function (the NR function) in accordance with the mode. FIG. 15 illustrates an example of a system configuration of the light receiving device 30 according to Example 4.

The light receiving device 30 according to Example 4 is provided with the NR (noise reduction) function as one of the functions of the imaging signal processing section 34, and includes a noise reduction circuit 341 that implements the NR function inside the imaging signal processing section 34. The light receiving device 30 according to Example 4 further includes an IR setting register 342 as a first register that sets the noise reduction function of the noise reduction circuit 341 for the IR mode, and a distance setting register 343 as a second register that sets the noise reduction function of the noise reduction circuit 341 for the distance (Depth) mode. The IR setting register 342 sets a relatively weak noise reduction function on the noise reduction circuit 341. The distance setting register 343 sets a relatively intense noise reduction function on the noise reduction circuit 341.

The intensity settings of the noise reduction function by the IR setting register 342 and the distance setting register 343 are executed under the control by the system controller 39 including the CPU. Specifically, the system controller 39 checks the mode setting as to whether the operation mode of the light receiving device 30 set by, for example, the user, is the IR mode or is the distance (Depth) mode, and as illustrated in FIG. 16, selects the usable register (the IR setting register 342 or the distance setting register 343) to thereby dynamically switch the intensity settings of the noise reduction function on the noise reduction circuit 341.

As described above, allowing the light receiving device 30 to internally have the function of dynamically switching the settings of the noise reduction function (the NR function) in accordance with the operation mode of the light receiving device 30 makes communication from the host outside the light receiving device 30 unnecessary, and thus makes it possible to quickly switch the intensity settings of the noise reduction function in accordance with the operation mode of the light receiving device 30.

It is to be noted that the technology according to Example 1, Example 2, or Example 3 is applicable also to the light receiving device 30 according to Example 4.

MODIFICATION EXAMPLES

Although the technology of the present disclosure has been described with reference to preferred embodiments, the technology of the present disclosure is not limited to the embodiments. The configurations and structures of the light receiving device described in the above embodiments are illustrative, and may be appropriately modified. For example, in the embodiments described above, the light receiving device that adopts the indirect ToF scheme has been described as an example; however, the ToF scheme is not limited to the indirect ToF scheme, and may be a direct (direct) ToF scheme that calculates a distance to a distance measurement target (a subject) directly from a difference in time of flight of light.

<Electronic Apparatus of Present Disclosure>

The distance measurement system including the light receiving device of the present disclosure described above is usable as a distance measurement system to be incorporated in any of various electronic apparatuses. Examples of the electronic apparatuses in which the distance measurement system is to be incorporated may include mobile apparatuses, including smartphones, digital cameras, tablets, and personal computers. However, the electronic apparatuses are not limited to the mobile apparatuses. Here, a smartphone is exemplified as a specific example of an electronic apparatus that is able to incorporate the distance measurement system including the light receiving device of the present disclosure (an electronic apparatus of the present disclosure).

FIG. 17A illustrates an external view of the smartphone according to the specific example of the electronic apparatus of the present disclosure as viewed from a front side, and FIG. 17B is an external view of the smartphone as viewed from a back side. A smartphone 100 according to this specific example includes a display unit 120 on the front side of a housing 110. Further, the smartphone 100 includes an imaging unit 130 at an upper portion of the back side of the housing 110.

It is possible to incorporate the distance measurement system 1 according to the embodiment of the present disclosure described above in the smartphone 100 as an example of the mobile apparatus having the above-described configuration for use. In this case, it is possible to dispose the light source unit 20 and the light receiving device 30 of the distance measurement system 1 above the display unit 120 as illustrated in FIG. 17A, for example. However, a disposition example of the light source unit 20 and the light receiving device 30 illustrated in FIG. 17A is one example, and this disposition example is thus non-limiting.

As described above, the smartphone 100 according to this specific example is fabricated by incorporating therein the distance measurement system 1 including the light receiving device 30 of the present disclosure. Further, by incorporating therein the distance measurement system 1 described above, the smartphone 100 according to this specific example is able to acquire a distance map image, and is therefore applicable to a face authentication system.

Further, by incorporating therein the distance measurement system 1 described above, the smartphone 100 is usable in such a manner as to turn off a touch panel display upon detecting that the user's ear approaches the smartphone 100 when the user makes a call. This makes it possible to reduce power consumption of the smartphone 100 and prevent a misoperation of the touch panel display. In addition, such a manner of use is also possible as to turn on the touch panel display upon detecting that the user's ear has become away from the smartphone 100 after the call.

<Possible Configurations of Present Disclosure>

It is to be noted that the present disclosure may also have the following configurations.

<<A. Light Receiving Device>>

[A-1] A light receiving device including:
- an imaging section in which a pixel including a light receiving element is disposed;
- a read processing section that reads a pixel signal from the imaging section;
- a signal processing section that executes predetermined signal processing on the pixel signal read by the read processing section; and
- a system controller,
- the light receiving device having a short distance mode that is freely settable, in which
- the system controller has a function of calculating, when the short distance mode is set, a distance to a distance measurement target with use of the pixel signal in a partial region within a pixel region of the imaging section, and a function of determining whether or not the distance calculated satisfies a detection condition that is set in advance.

[A-2] The light receiving device according to [A-1], in which, when calculating the distance and determining whether or not the detection condition is satisfied, the system controller stops output of the pixel signal to outside the light receiving device through the signal processing section.

[A-3] The light receiving device according to [A-2], in which the system controller stops the output of the pixel signal to outside the light receiving device by stopping supply of power to the signal processing section.

[A-4] The light receiving device according to [A-2] or [A-3], in which the system controller stops the output of the pixel signal to outside the light receiving device by stopping supply of a clock to the signal processing section.

[A-5] The light receiving device according to any one of [A-1] to [A-4], including a pixel integrator that integrates pixel values in the partial region within the pixel region of the imaging section, in which
- the system controller calculates the distance to the distance measurement target with use of a result of the integration by the pixel integrator.

[A-6] The light receiving device according to [A-5], in which the pixel integrator integrates the pixel values in the partial region within the pixel region of the imaging section for a number of frames necessary for calculating the distance to the distance measurement target.

[A-7] The light receiving device according to any one of [A-1] to [A-6], in which the detection condition is a distance value that is set in advance.

[A-8] The light receiving device according to [A-7], in which, where an upper limit and a lower limit are set for the distance value as the detection condition, the system controller determines that the detection condition is satisfied where a calculated distance value falls within a range between the upper limit and the lower limit, both inclusive, that are set for the distance value.

[A-9] The light receiving device according to [A-7], in which, where an upper limit and a lower limit are set for the distance value as the detection condition, the system controller determines that the detection condition is satisfied where a calculated distance value falls outside a range between the upper limit and the lower limit, both inclusive, that are set for the distance value.

[A-10] The light receiving device according to [A-3], in which the system controller stops supply of power to a circuit system including the read processing section during a vertical blanking period.

[A-11] The light receiving device according to [A-1], in which the signal processing section includes a noise reduction circuit that performs a process of noise reduction on the pixel signal read by the read processing section.

[A-12] The light receiving device according to [A-11], in which as operation modes of the light receiving device, an infrared light mode for acquiring an image based on infrared light and a distance mode for acquiring a distance map image are settable, and the signal processing section includes a first register that sets a relatively weak noise reduction function on the noise reduction circuit when in the infrared light mode, and a second register that sets a relatively intense noise reduction function on the noise reduction circuit when in the distance mode.

[A-13] The light receiving device according to [A-12], in which the system controller selects the first register or the second register in accordance with the operation mode of the light receiving device, and switches intensity settings of the noise reduction function on the noise reduction circuit.

<<B. Method of Controlling Light Receiving Device>>

[B-1] A method of controlling a light receiving device, the light receiving device including:

an imaging section in which a pixel including a light receiving element is disposed;

a read processing section that reads a pixel signal from the imaging section; and a signal processing section that executes predetermined signal processing on the pixel signal read by the read processing section, the light receiving device having a short distance mode that is freely settable, the method including, in controlling the light receiving device, calculating, when the short distance mode is set, a distance to a distance measurement target with use of the pixel signal in a partial region within a pixel region of the imaging section, and determining whether or not the distance calculated satisfies a detection condition that is set in advance.

<<C. Electronic Apparatus>>

[C-1] An electronic apparatus including a light source unit, and a light receiving device, the light receiving device including:

an imaging section in which a pixel including a light receiving element is disposed;

a read processing section that reads a pixel signal from the imaging section;

a signal processing section that executes predetermined signal processing on the pixel signal read by the read processing section; and a system controller, the light receiving device having a short distance mode that is freely settable, in which the system controller has a function of calculating, when the short distance mode is set, a distance to a distance measurement target with use of the pixel signal in a partial region within a pixel region of the imaging section, and a function of determining whether or not the distance calculated satisfies a detection condition that is set in advance.

[C-2] The electronic apparatus according to [C-1], in which, when calculating the distance and determining whether or not the detection condition is satisfied, the system controller stops output of the pixel signal to outside the light receiving device through the signal processing section.

[C-3] The electronic apparatus according to [C-2], in which the system controller stops the output of the pixel signal to outside the light receiving device by stopping supply of power to the signal processing section.

[C-4] The electronic apparatus according to [C-2] or [C-3], in which the system controller stops the output of the pixel signal to outside the light receiving device by stopping supply of a clock to the signal processing section.

[C-5] The electronic apparatus according to any one of [C-1] to [C-4], including a pixel integrator that integrates pixel values in the partial region within the pixel region of the imaging section, in which the system controller calculates the distance to the distance measurement target with use of a result of the integration by the pixel integrator.

[C-6] The electronic apparatus according to [C-5], in which the pixel integrator integrates the pixel values in the partial region within the pixel region of the imaging section for a number of frames necessary for calculating the distance to the distance measurement target.

[C-7] The electronic apparatus according to any one of [C-1] to [C-6], in which the detection condition is a distance value that is set in advance.

[C-8] The electronic apparatus according to [C-7], in which, where an upper limit and a lower limit are set for the distance value as the detection condition, the system controller determines that the detection condition is satisfied where a calculated distance value falls within a range between the upper limit and the lower limit, both inclusive, that are set for the distance value.

[C-9] The electronic apparatus according to [C-7], in which, where an upper limit and a lower limit are set for the distance value as the detection condition, the system controller determines that the detection condition is satisfied where a calculated distance value falls outside a range between the upper limit and the lower limit, both inclusive, that are set for the distance value.

[C-10] The electronic apparatus according to [C-3], in which the system controller stops supply of power to a circuit system including the read processing section during a vertical blanking period.

[C-11] The electronic apparatus according to [C-1], in which the signal processing section includes a noise reduction circuit that performs a process of noise reduction on the pixel signal read by the read processing section.

[C-12] The electronic apparatus according to [C-11], in which as operation modes of the light receiving device, an infrared light mode for acquiring an image based on infrared light and a distance mode for acquiring a distance map image are settable, and the signal processing section includes a first register that sets a relatively weak noise reduction function on the noise reduction circuit when in the infrared light mode, and a second register that sets a relatively intense noise reduction function on the noise reduction circuit when in the distance mode.

[C-13] The electronic apparatus according to [C-12], in which the system controller selects the first register or the second register in accordance with the operation mode of the light receiving device, and switches intensity settings of the noise reduction function on the noise reduction circuit.

REFERENCE SIGNS LIST

1 . . . distance measurement system, 10 . . . subject (distance measurement target), 20 . . . light source unit, 30 . . . light receiving device, 31 . . . imaging section,

32 . . . read/AD conversion processing section, 33 . . . imaging drive section, 34 . . . imaging signal processing section, 35 . . . output I/F controller, 36 . . . serial I/F controller, 37 . . . memory section, 38 . . . timing generator, 39 . . . system controller, 40 . . . application processor, 41 . . . input I/F controller, 42 . . . pixel integrator, 43 . . . power supply controller, 51 . . . pixel, 341 . . . noise reduction circuit (NR), 342 . . . IR setting register, 343 . . . depth setting register

The invention claimed is:

1. A light receiving device, comprising:
- an imaging section that comprises a pixel, wherein the pixel includes a light receiving element;
- a read processing section that is configured to read a pixel signal from the imaging section;
- a signal processing section that is configured to execute a predetermined signal processing on the pixel signal read by the read processing section; and
- a system controller, wherein the light receiving device has a short distance mode that is freely settable, and
- wherein the system controller is configured to:
  - calculate, based on the short distance mode being set, a distance to a distance measurement target with use of the pixel signal in a partial region within a pixel region of the imaging section,
  - determine whether the calculated distance satisfies a detection condition that is set in advance; and
  - stop an output of the pixel signal to outside the light receiving device through the signal processing section based on the calculation of the distance and the determination of whether the detection condition is satisfied, wherein the output of the pixel signal to outside the light receiving device is stopped based on a stoppage of supply of a clock to the signal processing section.

2. The light receiving device according to claim 1, wherein the system controller is further configured to stop the output of the pixel signal to outside the light receiving device based on a stoppage of supply of power to the signal processing section.

3. The light receiving device according to claim 2, wherein the system controller is further configured to stop supply of power to a circuit system including the read processing section during a vertical blanking period.

4. The light receiving device according to claim 1, further comprising a pixel integrator that is configured to integrate pixel values in the partial region within the pixel region of the imaging section, wherein the system controller is configured to calculate the distance to the distance measurement target with use of a result of the integration by the pixel integrator.

5. The light receiving device according to claim 4, wherein the pixel integrator is configured to integrate the pixel values in the partial region within the pixel region of the imaging section for a number of frames necessary for the calculation of the distance to the distance measurement target.

6. The light receiving device according to claim 1, wherein the detection condition is a distance value.

7. The light receiving device according to claim 6, wherein, based on an upper limit and a lower limit for the distance value as the detection condition, the system controller is further configured to determine that the detection condition is satisfied where a calculated distance value falls within a range between the upper limit and the lower limit, inclusive of the upper limit and the lower limit.

8. The light receiving device according to claim 6, wherein, based on an upper limit and a lower limit for the distance value as the detection condition, the system controller is further configured to determine that the detection condition is satisfied where a calculated distance value falls outside a range between the upper limit and the lower limit, inclusive of the upper limit and the lower limit.

9. The light receiving device according to claim 1, wherein the signal processing section includes a noise reduction circuit that is configured to perform a process of noise reduction on the pixel signal read by the read processing section.

10. The light receiving device according to claim 9, wherein:
- as operation modes of the light receiving device, an infrared light mode for acquisition of an image based on infrared light and a distance mode for acquisition of a distance map image are settable, and the signal processing section includes:
  - a first register that is configured to set a relatively weak noise reduction function on the noise reduction circuit in a case where the light receiving device is in the infrared light mode, and
  - a second register that is configured to set a relatively intense noise reduction function on the noise reduction circuit in a case where the light receiving device is in the distance mode.

11. The light receiving device according to claim 10, wherein the system controller is further configured to:
- select the first register or the second register based on an operation mode of the operation modes of the light receiving device; and
- switch intensity settings of the relatively weak noise reduction function or the relatively intense noise reduction function on the noise reduction circuit.

12. A method of controlling a light receiving device, the light receiving device including:
- an imaging section that comprises a pixel, wherein the pixel includes a light receiving element;
- a read processing section that is configured to read a pixel signal from the imaging section; and
- a signal processing section that is configured to execute a predetermined signal processing on the pixel signal read by the read processing section,
  - wherein the light receiving device has a short distance mode that is freely settable, and wherein the method comprises:
    - calculating, based on the short distance mode being set, a distance to a distance measurement target with use of the pixel signal in a partial region within a pixel region of the imaging section, and
    - determining whether the calculated distance satisfies a detection condition that is set in advance; and
    - stopping an output of the pixel signal to outside the light receiving device through the signal processing section based on the calculation of the distance and the determination of whether the detection condition is satisfied, wherein the output of the pixel signal to outside the light receiving device is stopped based on a stoppage of supply of a clock to the signal processing section.

13. An electronic apparatus, comprising:
- a light source unit; and
- a light receiving device, wherein the light receiving device includes:
  - an imaging section that comprises a pixel, wherein the pixel includes a light receiving element;

a read processing section that is configured to read a pixel signal from the imaging section;

a signal processing section that is configured to execute a predetermined signal processing on the pixel signal read by the read processing section; and a system controller, wherein the light receiving device having a short distance mode that is freely settable, and wherein the system controller is configured to-has a function of;

calculate, based on the short distance mode being set, a distance to a distance measurement target with use of the pixel signal in a partial region within a pixel region of the imaging section, determine whether the calculated distance satisfies a detection condition that is set in advance; and stop an output of the pixel signal to outside the light receiving device through the signal processing section based on the calculation of the distance and the determination of whether the detection condition is satisfied, wherein the output of the pixel signal to outside the light receiving device is stopped based on a stoppage of supply of a clock to the signal processing section.

* * * * *